US012579419B1

(12) United States Patent
Jang

(10) Patent No.: US 12,579,419 B1
(45) Date of Patent: Mar. 17, 2026

(54) SYSTEM AND SoC COMPRISING HETEROGENEOUS PROCESSORS CAPABLE OF PROCESSING ARTIFICIAL INTELLIGENCE AND METHOD THEREOF

(71) Applicant: DEEPX CO., LTD., Seongnam-si (KR)

(72) Inventor: Jeong Gyu Jang, Suwon-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/336,529

(22) Filed: Sep. 23, 2025

(30) Foreign Application Priority Data

Mar. 24, 2025 (KR) ........................ 10-2025-0037583

(51) Int. Cl.
*G06N 3/063* (2023.01)
*G06N 3/082* (2023.01)
(52) U.S. Cl.
CPC ............. *G06N 3/063* (2013.01); *G06N 3/082* (2013.01)
(58) Field of Classification Search
CPC ................................ G06N 3/063; G06N 3/082
See application file for complete search history.

(56) References Cited

U.S. PATENT DOCUMENTS

2023/0297519 A1 * 9/2023 Kim ........................ G06N 3/063
706/15

FOREIGN PATENT DOCUMENTS

| | | | | |
|---|---|---|---|---|
| CN | 110852439 A | * | 2/2020 | .............. G06N 3/08 |
| KR | 10-2020-0111948 A | | 10/2020 | |
| KR | 10-2021-0084123 A | | 7/2021 | |
| KR | 10-2022-0049759 A | | 4/2022 | |

OTHER PUBLICATIONS

Risso, Matteo, Alessio Burrello, Giuseppe Maria Sarda, Luca Benini, Enrico Macii, Massimo Poncino, Marian Verhelst, and Daniele Jahier Pagliari. "Precision-aware latency and energy balancing on multi-accelerator platforms for dnn inference." In 2023 IEEE/ACM Int'l Symposium on Low Power Electronics (Year: 2023).*
(Continued)

*Primary Examiner* — Casey R. Garner
(74) *Attorney, Agent, or Firm* — INVENSTONE PATENT, LLC

(57) ABSTRACT

According to an example of the present disclosure, a system is provided. The system may include: a plurality of heterogeneous processors configured to perform inference using a neural network model comprising a plurality of layers; a memory for storing the neural network model, wherein each layer of the neural network model comprises a plurality of parameters having different bit-widths; and a controller for assigning an operation for an arbitrary layer of the neural network model to an arbitrary processor among the plurality of heterogeneous processors. An operation for a first portion of the arbitrary layer of the neural network model may be assigned to a first processor among the plurality of heterogeneous processors. An operation for a second portion of the arbitrary layer of the neural network model may be assigned to a second processor among the plurality of heterogeneous processors. A first bit-width of a first parameter for the first portion and a second bit-width of a second parameter for the second portion may be different from each other.

20 Claims, 18 Drawing Sheets

(56) References Cited

OTHER PUBLICATIONS

Dobiáš, Petr, Emmanuel Casseau, and Oliver Sinnen. "Comparison of Enhancing Methods for Primary/Backup Approach Meant for Fault Tolerant Scheduling." PhD diss., Univ Rennes, Inria, CNRS, IRISA, France, 2021. (Year: 2021).*

Chen, Le, Dahu Feng, Erhu Feng, Rong Zhao, Yingrui Wang, Yubin Xia, Haibo Chen, and Pinjie Xu. "HeteroLLM: Accelerating Large Language Model Inference on Mobile SoCs platform with Heterogeneous AI Accelerators." arXiv preprint arXiv:2501.14794 (2025). (Year: 2025).*

* cited by examiner

110a

PE1     PE4     PE7

PE2     PE5     PE8

PE3     PE6

110a-1    110a-2    110a-3    110a-4    110a-5    110a-6    110a-7

| Layer #1 | Original | |
|---|---|---|
| Layer #2 | 8-bit Q | Prune 50% |
| Layer #3 | 4-bit Q | |
| Layer #4 | Original | |
| Layer #5 | Sub 4-bit Q | Prune 40% |
| Layer #6 | 8-bit Q | |
| Layer #7 | Sub 4-bit Q | |
| Layer #8 | Original | Prune 60% |

FIG. 9

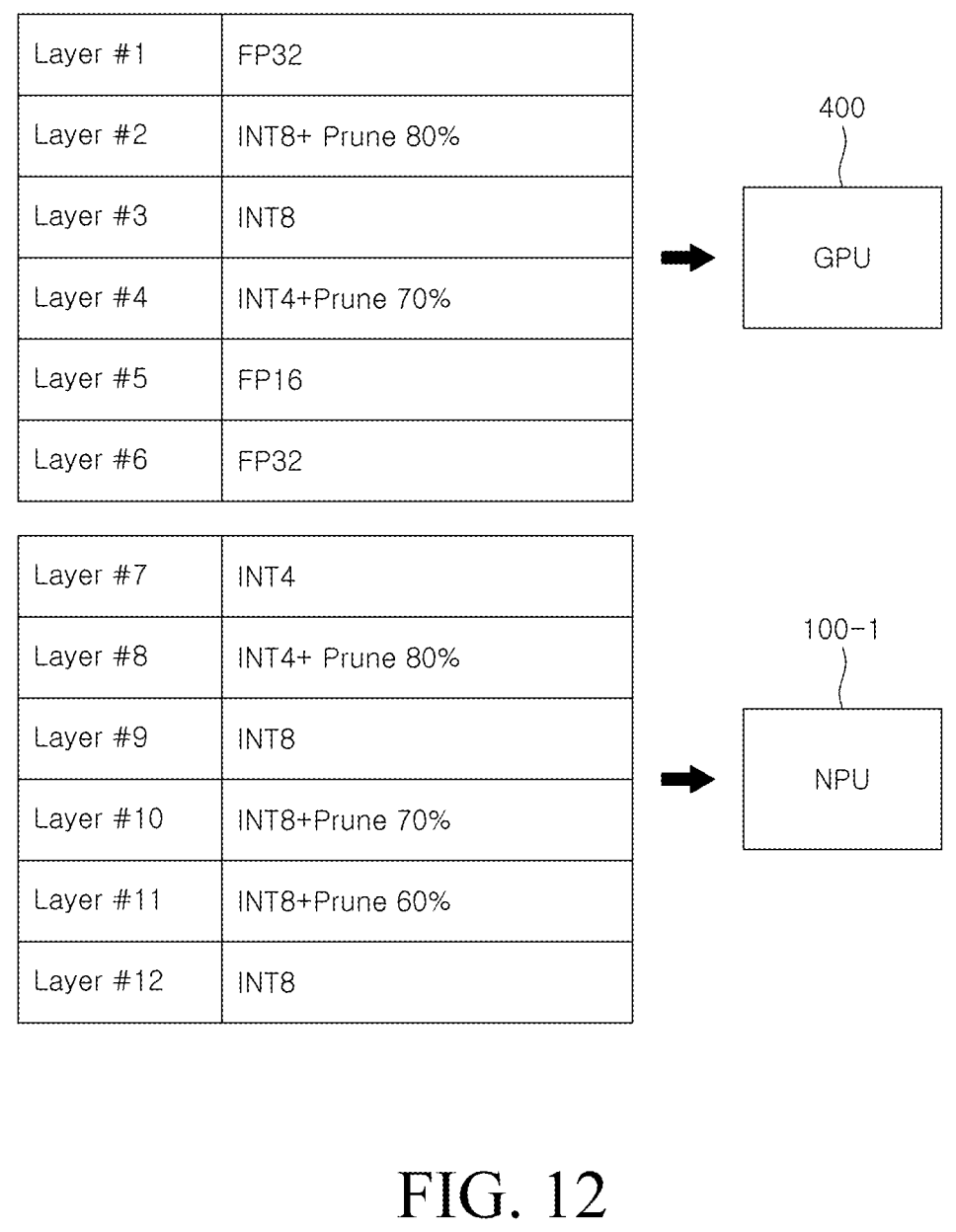

| Layer #1 | FP32 |
|----------|------|
| Layer #2 | INT8+ Prune 80% |
| Layer #3 | INT8 |
| Layer #4 | INT4+Prune 70% |
| Layer #5 | FP16 |
| Layer #6 | FP32 |

400

GPU

| Layer #7 | INT4 |
|----------|------|
| Layer #8 | INT4+ Prune 80% |
| Layer #9 | INT8 |
| Layer #10 | INT8+Prune 70% |
| Layer #11 | INT8+Prune 60% |
| Layer #12 | INT8 |

100−1

NPU

FIG. 12

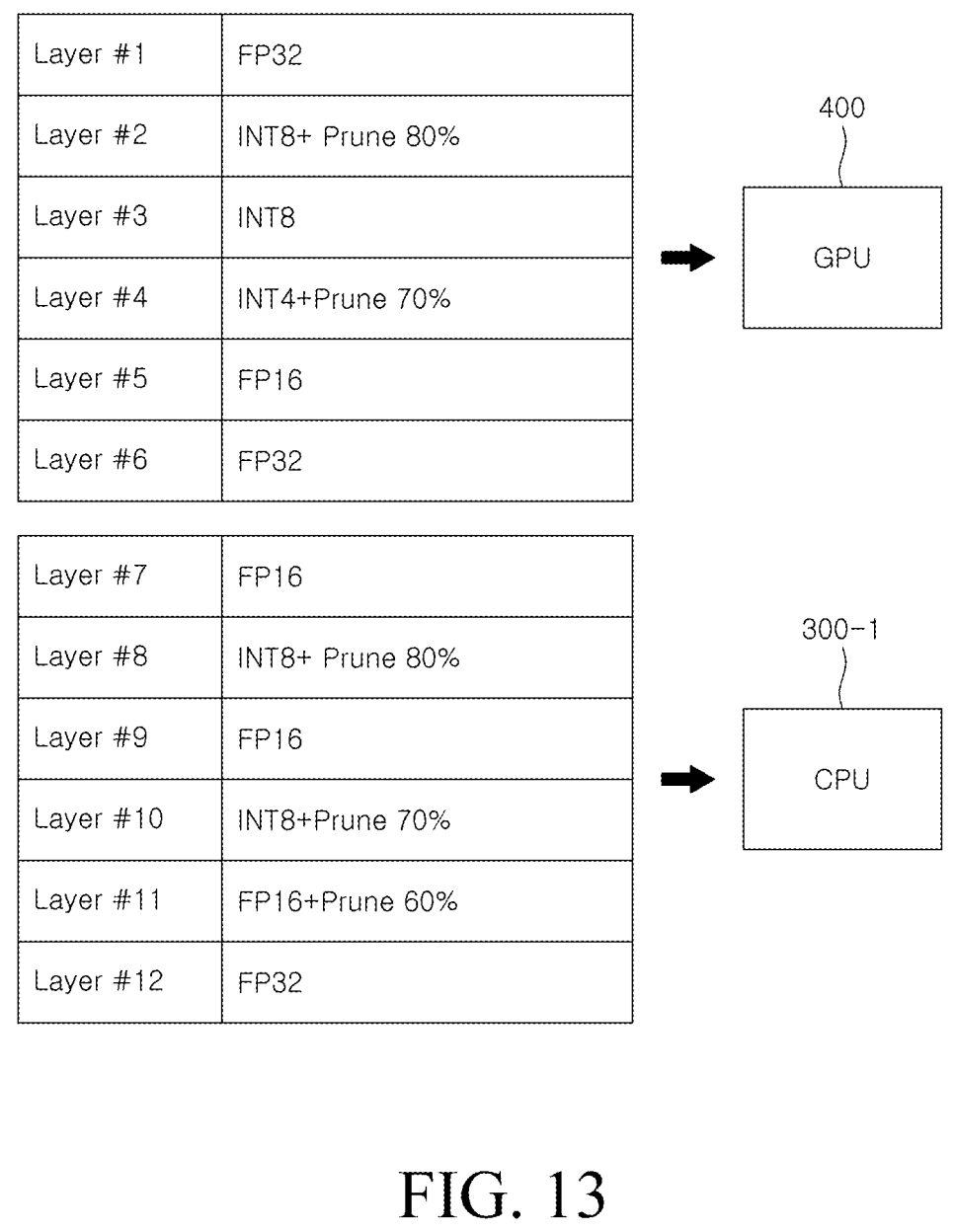

| Layer #1 | FP32 |
|----------|------|
| Layer #2 | INT8+ Prune 80% |
| Layer #3 | INT8 |
| Layer #4 | INT4+Prune 70% |
| Layer #5 | FP16 |
| Layer #6 | FP32 |

400

GPU

| Layer #7 | FP16 |
|----------|------|
| Layer #8 | INT8+ Prune 80% |
| Layer #9 | FP16 |
| Layer #10 | INT8+Prune 70% |
| Layer #11 | FP16+Prune 60% |
| Layer #12 | FP32 |

300-1

CPU

FIG. 13

| | Main Target Hardware | | Sub Target Hardware | |
|---|---|---|---|---|
| | Lightening Technique | Assigned Hardwaree | Lightening Technique | Assigned Hardwaree |
| Layer #1 | FP32 | GPU | INT4 | NPU1 |
| Layer #2 | INT8 + Prune 80% | GPU | INT4 | NPU1 |
| Layer #3 | INT8 | GPU | INT4 + Prune 80% | NPU1 |
| Layer #4 | INT4 + Prune 70% | GPU | INT8 | NPU2 |
| Layer #5 | FP16 | GPU | INT8 | NPU2 |
| Layer #6 | FP32 | GPU | INT8 + Prune 70% | NPU2 |
| Layer #7 | INT4 | NPU1 | INT8 + Prune 60% | NPU2 |
| Layer #8 | INT4 + Prune 80% | NPU1 | FP16 | GPU |
| Layer #9 | INT8 | NPU2 | FP32 | GPU |
| Layer #10 | INT8 + Prune 70% | NPU2 | INT4 | NPU1 |
| Layer #11 | INT8 + Prune 60% | NPU2 | INT4 | NPU1 |
| Layer #12 | INT8 | NPU2 | INT4 + Prune 80% | NPU1 |

FIG. 16

SYSTEM AND SoC COMPRISING HETEROGENEOUS PROCESSORS CAPABLE OF PROCESSING ARTIFICIAL INTELLIGENCE AND METHOD THEREOF

CROSS-REFERENCE TO RELATED APPLICATIONS

This application claims the priority of Korean Patent Application No. 10-2025-0037583 filed on Mar. 24, 2025 in the Korean Intellectual Property Office, the disclosure of which is incorporated herein by reference.

BACKGROUND OF THE DISCLOSURE

Technical Field

The present disclosure relates to a system, a System on Chip (SoC), and a method of operating the same, comprising heterogeneous processors capable of processing a neural network.

Background Art

Artificial Intelligence (AI) is gradually advancing. AI refers to the artificial imitation of human intelligence, which includes functions such as Recognition, Classification, Inference. Prediction, and Control/Decision making.

Since an AI model must ultimately be processed on hardware, the selection of appropriate hardware is crucial for processing artificial intelligence operations. For example, a Neural Processing Unit (NPU) or an AI hardware accelerator is hardware specialized for AI operations and can process AI operations quickly and efficiently when combined with an AI model. Hardware for processing AI operations may include not only an NPU but also a Central Processing Unit (CPU), a Graphics Processing Unit (GPU), a Tensor Processing Unit (TPU), and may further include hardware to be implemented in the future.

SUMMARY OF THE DISCLOSURE

Recently, various types of hardware have been developed to efficiently process the operational speed for Artificial Intelligence (AI).

Each piece of hardware may have constraints in terms of performance, processing capability, power consumption, and so on. In such cases, it may not be technically clear which hardware should process a neural network model to achieve optimal performance.

The technical problem to be solved by the present embodiment is not limited to the technical problem described above, and other technical problems can be inferred from the following embodiments.

To achieve the above-mentioned objective, according to an example of the present disclosure, a system is presented. The system may include: a plurality of heterogeneous processors configured to perform inference using a neural network model comprising a plurality of layers; a memory for storing the neural network model, wherein each layer of the neural network model comprises a plurality of parameters having different bit-widths; and a controller for assigning an operation for an arbitrary layer of the neural network model to an arbitrary processor among the plurality of heterogeneous processors. An operation for a first portion of the arbitrary layer of the neural network model may be assigned to a first processor among the plurality of heterogeneous processors. An operation for a second portion of the arbitrary layer of the neural network model may be assigned to a second processor among the plurality of heterogeneous processors. A first bit-width of a first parameter for the first portion and a second bit-width of a second parameter for the second portion may be different from each other.

According to another example of the present disclosure, a System on Chip (SoC) is provided. The SoC may include: a plurality of heterogeneous processors configured to perform inference using a neural network model comprising a plurality of layers; a memory for storing the neural network model, wherein each layer of the neural network model comprises a plurality of parameters having different bit-widths; and a controller for assigning an operation for an arbitrary layer of the neural network model to an arbitrary processor among the plurality of heterogeneous processors. An operation for a first portion of the arbitrary layer of the neural network model may be assigned to a first processor among the plurality of heterogeneous processors. An operation for a second portion of the arbitrary layer of the neural network model may be assigned to a second processor among the plurality of heterogeneous processors. A first bit-width of a first parameter for the first portion and a second bit-width of a second parameter for the second portion may be different from each other.

According to another example of the present disclosure, a method is provided. The method may include: a step of assigning an operation for a first portion of an arbitrary layer of a neural network model to a first processor among a plurality of heterogeneous processors; and a step of assigning an operation for a second portion of the arbitrary layer of the neural network model to a second processor among the plurality of heterogeneous processors. Each layer of the neural network model may include a plurality of parameters having different bit-widths. The first bit-width of a first parameter for the first portion and the second bit-width of a second parameter for the second portion may be different from each other.

An electronic device includes a plurality of heterogeneous processors for performing inference using a neural network model comprising a plurality of layers, a memory for storing the neural network model, and a controller for assigning an operation for a current layer of the neural network model to one of the plurality of heterogeneous processors, wherein the layers include a first layer comprising parameters having a first bit-width and a second layer comprising parameters having a second bit-width, the controller selects at least one processor from among the plurality of heterogeneous processors to perform an operation for the first layer of the neural network model based on the parameters of the first layer, the controller selects at least one processor from among the plurality of heterogeneous processors to perform an operation for the second layer of the neural network model based on the parameters of the second layer, the first bit-width and the second bit-width are different from each other, the processor selected to perform the operation for the first layer includes a first main target processor and at least one first sub target processor, the processor selected to perform the operation for the second layer includes a second main target processor and at least one second sub target processor, if the first main target processor cannot perform the operation for the first layer, the operation for the first layer is assigned to the at least one first sub target processor, and if the second main target processor cannot perform the operation for the second layer, the operation for the second layer may be assigned to the at least one second sub target processor.

According to the present disclosure, when a plurality of heterogeneous processors exist, a neural network model can be processed with optimal performance by assigning the operation for an arbitrary layer of the neural network model to the most suitable processor.

According to the disclosure of the present disclosure, when a new neural network model is applied to a new system, it is not necessary to retrain the neural network model, thereby saving time and cost.

BRIEF DESCRIPTION OF THE DRAWINGS

FIG. 9 illustrates an example of performing lightening (i.e., compression) differently for each layer of a neural network model.

FIG. 12 illustrates an example in which the operations for each layer of a neural network model are assigned to hardware according to the procedure shown in FIG. 10.

FIG. 13 illustrates an example in which the hardware assigned according to the example of FIG. 12 is changed.

FIG. 16 shows the main target hardware and sub target hardware determined for each layer, according to an embodiment.

DETAILED DESCRIPTION OF THE EMBODIMENT

Figure 1:
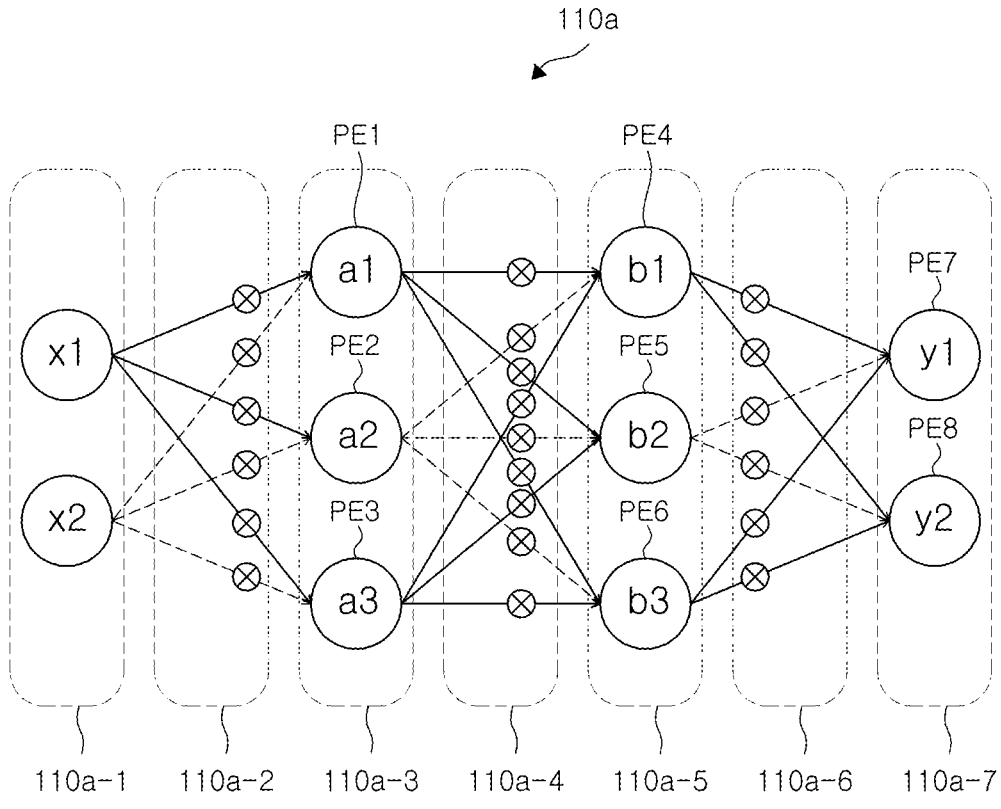
FIG. 1 is a schematic conceptual diagram illustrating an exemplary neural network model.

Specific structural or procedural descriptions of the examples of the present disclosure are merely for the purpose of illustrating examples according to the concept of the present disclosure. Accordingly, examples according to the concept of the present disclosure may be implemented in various forms. Examples according to the concept of the present disclosure may be implemented in various forms. The present disclosure should not be construed as being limited to the examples of the present disclosure.

Various changes may be made to the examples according to the concept of the present disclosure, and they may have various forms. Accordingly, specific examples are illustrated in the drawings and will be described in detail in the present disclosure or application. However, this is not intended to limit the examples according to the concept of the present disclosure to a specific disclosed form. It should be understood that the concept of the present disclosure includes all changes, equivalents, or substitutes included in the spirit and technical scope of the present disclosure.

Terms such as "first" and/or "second" may be used to describe various components, but the components should not be limited by these terms. These terms may be used only for the purpose of distinguishing one component from another. Without departing from the scope of rights according to the concept of the present disclosure, a first component may be named as a second component, and similarly, a second component may also be named as a first component.

When a component is referred to as being "connected" or "coupled" to another component, it can be directly connected or coupled to the other component. However, it should be understood that other components may exist between the plurality of components. On the other hand, when a component is referred to as being "directly connected" or "directly coupled" to another component, it should be understood that there are no other components in between. Other expressions for describing the relationship between components, i.e., "between" and "immediately between" or "adjacent to" and "directly adjacent to," should be interpreted in the same way.

The terminology used in the present disclosure is for the purpose of describing particular examples only and is not intended to be limiting of the disclosure. A singular expression includes a plural expression unless the context clearly indicates otherwise. In the present disclosure, terms such as "comprise" or "have" are intended to designate the presence of described features, numbers, steps, operations, components, parts, or combinations thereof. Therefore, it should be understood that the presence or addition of one or more other features or numbers, steps, operations, components, parts, or combinations thereof is not precluded.

Unless otherwise defined, all terms used herein, including technical or scientific terms, have the same meaning as commonly understood by one of ordinary skill in the art to which this disclosure belongs. Terms such as those defined in commonly used dictionaries should be interpreted as having a meaning that is consistent with their meaning in the context of the relevant art. Terms such as those defined in commonly used dictionaries are not to be interpreted in an idealized or overly formal sense unless expressly so defined herein.

In describing the examples, descriptions of technologies that are well-known in the technical field to which the present disclosure belongs and are not directly related to the present disclosure will be omitted. This is to deliver the gist of the present disclosure more clearly by omitting unnecessary explanations.

Definition of Terms

Hereinafter, to aid in the understanding of the disclosures presented in the present disclosure, the terms used in the present disclosure will be briefly summarized.

NPU: An abbreviation for Neural Processing Unit, which may refer to a processor specialized for the operations of a neural network model, separate from a CPU (Central Processing Unit).

NN: An abbreviation for neural network, which may refer to a network that connects nodes in a layer structure, imitating the connection of neurons in the human brain through synapses, to mimic human intelligence.

DNN: An abbreviation for Deep Neural Network, which may refer to an artificial neural network with an increased number of hidden layers to implement higher artificial intelligence.

CNN: An abbreviation for Convolutional Neural Network, which is a neural network that functions similarly to how the visual cortex in the human brain processes images. Convolutional neural networks are known to be suitable for image processing and are known to be useful for extracting features of input data and identifying patterns of features.

Hereinafter, the present disclosure will be described in detail by explaining preferred examples of the present disclosure with reference to the attached drawings. Hereinafter, examples of the present disclosure will be described in detail with reference to the attached drawings.

<Artificial Intelligence>

Humans possess intelligence that enables them to perform tasks such as Recognition. Classification, Inference, Prediction, and Control/Decision making. Artificial Intelligence (AI) refers to the artificial imitation of human intelligence.

The human brain consists of numerous nerve cells called neurons. Each neuron is connected to hundreds or thousands of other neurons through connections called synapses. A neural network model is a model of the operating principles of biological neurons and the connection relationships between neurons, created to imitate human intelligence. That is, an artificial neural network is a system in which nodes that mimic neurons are connected in a layer structure.

Such neural network models are classified into 'single-layer neural networks' and 'multi-layer neural networks' according to the number of layers. A general multi-layer neural network consists of an input layer, a hidden layer, and an output layer. (1) The input layer is a layer that receives external data, and the number of neurons in the input layer is the same as the number of input variables. (2) The hidden layer is located between the input layer and the output layer, receives signals from the input layer, extracts features, and transmits them to the output layer. (3) The output layer receives signals from the hidden layer and outputs them to the outside. The input signal between neurons is multiplied by each connection strength, which has a value between 0 and 1, and then summed. If this sum is greater than the neuron's threshold, the neuron is activated and implemented as an output value through an activation function.

Meanwhile, a Deep Neural Network (DNN) is a neural network in which the number of hidden layers of an artificial neural network is increased to implement higher artificial intelligence.

DNNs are being developed in various structures. For example, a convolutional neural network (CNN), an example of a DNN, is known to be useful for extracting features of input values (videos or images) and identifying patterns of the extracted output values. A CNN may be configured in a form in which convolution operations, activation function operations, pooling operations, and the like are processed in a specific order.

For example, in each layer of a DNN, parameters (i.e., input values, output values, weights, or kernels, etc.) can be a matrix composed of multiple channels. The parameters can be processed in a Neural Processing Unit (NPU) by convolution or matrix multiplication. An output value is generated after the operation is processed in each layer.

For example, a transformer is a DNN based on an attention mechanism. The transformer utilizes many matrix multiplication operations. The transformer can obtain an output value, attention (Q, K, V), using input values and parameters such as query (Q), key (K), and value (V). The transformer can process various inference operations based on the output value (i.e., attention (Q, K, V)). The transformer tends to show better inference performance than a CNN.

The 'Transformer' can be used in language models (Large Language Model, LLM and small LLMs). Language models include BERT (Bidirectional Encoder Representations from Transformers), GPT (Generative Pre-trained Transformer), RoBERTa (Robustly Optimized BERT Pretraining Approach), ALBERT (A Lite BERT), ELECTRA (Efficiently Learning an Encoder that Classifies Token Replacements Accurately), Transformer-XL (Transformer with Extra Long Context), XLNet (a model combining the advantages of GPT and BERT), BART (Bidirectional and Auto-Regressive Transformers), CTRL (Conditional Transformer Language), T5 (Text-to-Text Transfer Transformer), LaMDA (Language Model for Dialogue Applications), Gopher (DeepMind's LLM), InstructGPT (a fine-tuned model based on GPT-3), PanGu (Huawei's Chinese model), PaLM (Pathways Language Model), OPT 175B (Open Pre-trained Transformer 175B), BLOOM (BigScience Large Open-science Open-access Multilingual Model). Hyper-CLOVA (Naver's Korean super-giant model), and may also include new language models that will emerge in the future.

The transformer can be used not only in natural language processing (NLP) but also in computer vision. Representative transformer-based image models include ViT (Vision Transformer), Swin Transformer (Sliding Window-based Transformer for Vision), and others. Therefore, the transformer is one of the key techniques of various artificial intelligence models that utilize the attention mechanism. The following neural processing unit can execute any artificial intelligence model such as a transformer-based language model, a vision transformer, a CNN-based model, etc.

Hereinafter, 'hardware' may include processors such as GPU. NPU, and TPU. Heterogeneous hardware may mean different types of processors (e.g., GPU and NPU) or may include physically separate processors of the same type (e.g., NPU1 and NPU2).

FIG. 1 is a schematic conceptual diagram illustrating an exemplary neural network model.

Hereinafter, the operation of an exemplary neural network model 110a that can be operated in the neural processing unit 100 will be described.

The exemplary neural network model 110a in FIG. 1 may be an artificial neural network trained to perform various inference functions such as object recognition and speech recognition.

The neural network model 110a may be a Deep Neural Network (DNN).

However, the neural network model 110a according to the examples of the present disclosure is not limited to a deep neural network.

For example, the neural network model 110a may be implemented with models such as LLM (Large Language Model), Generative Adversarial Networks (GAN), Florence, DaViT, MobileViT, Swin-Transformer, Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLe-Net, Resnet-v2, Resnet50, Resnet101, Inception-v3, etc. However, the present disclosure is not limited to the models described above. In addition, the neural network model 110a may be an ensemble model based on at least two different models.

Hereinafter, the inference process performed by the exemplary neural network model 110a will be described.

The neural network model 110a is an exemplary deep neural network model including an input layer 110a-1, a first connection network 110a-2, a first hidden layer 110a-3, a second connection network 110a-4, a second hidden layer 110a-5, a third connection network 110a-6, and an output layer 110a-7. However, the present disclosure is not limited to the neural network model shown in FIG. 1. The first hidden layer 110a-3 and the second hidden layer 110a-5 may also be referred to as a plurality of hidden layers.

The input layer 10a-1 may, for example, include x1 and x2 input nodes. That is, the input layer 110a-1 may include information about two input values.

The first connection network 110a-2 may, for example, include information about six weight values for connecting each node of the input layer 110a-1 to each node of the first hidden layer 110a-3. Each weight value is multiplied by an input node value, and the accumulated value of the multiplied values is stored in the first hidden layer 110a-3. The weight value and the input node value may be referred to as parameters of the neural network model.

The first hidden layer 110a-3 may, for example, include a1, a2, and a3 nodes. That is, the first hidden layer 110a-3 may include information about three node values.

The first processing element PE1 in FIG. 1 can process the operation of the a1 node.

The second processing element PE2 in FIG. 1 can process the operation of the a2 node.

The third processing element PE3 in FIG. 1 can process the operation of the a3 node. The second connection network 110a-4 may, for example, include information about nine weight values for connecting each node of the first hidden layer 110a-3 to each node of the second hidden layer 110a-5. The weight value of the second connection network 110a-4 is multiplied by each node value input from the first hidden layer 110a-3, and the accumulated value of the multiplied values is stored in the second hidden layer 110a-5.

The second hidden layer 110a-5 may, for example, include b1, b2, and b3 nodes. That is, the second hidden layer 110a-5 may include information about three node values.

The fourth processing element PE4 in FIG. 1 can process the operation of the b1 node.

The fifth processing element PE5 in FIG. 1 can process the operation of the b2 node.

The sixth processing element PE6 in FIG. 1 can process the operation of the b3 node.

The third connection network 110a-6 may, for example, include information about six weight values connecting each node of the second hidden layer 110a-5 and each node of the output layer 110a-7. The weight value of the third connection network 110a-6 is multiplied by each node value input from the second hidden layer 110a-5, and the accumulated value of the multiplied values is stored in the output layer 110a-7.

The output layer 10a-7 may, for example, include y1 and y2 nodes. That is, the output layer 110a-7 may include information about two node values.

The seventh processing element PE7 in FIG. 1 can process the operation of the y1 node.

The eighth processing element PE8 in FIG. 1 can process the operation of the y2 node.

Each node may correspond to a feature value, and a feature value may correspond to a feature map.

Figure 2A:
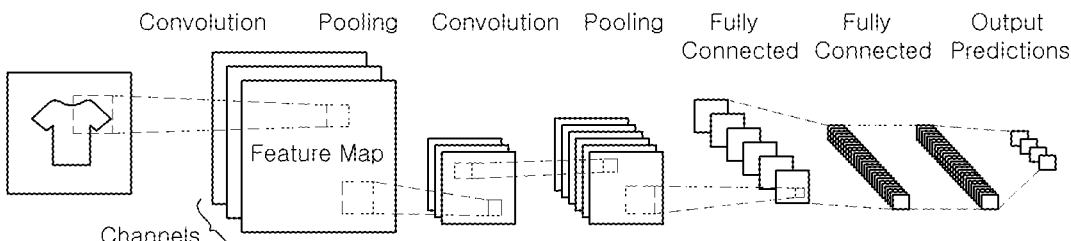
FIG. 2A is a diagram for explaining the basic structure of a Convolutional Neural Network (CNN).

FIG. 2A is a diagram for explaining the basic structure of a Convolutional Neural Network (CNN).

Referring to FIG. 2A, an input image can be represented as a two-dimensional matrix composed of a specific size of rows and a specific size of columns. The input image can have a plurality of channels, where a channel can represent the number of color components of the input data image.

The convolution process means performing a convolution operation with a kernel while traversing the input image at a specified interval.

A convolutional neural network can have a structure that passes the output value (convolution or matrix multiplication) of the current layer as the input value to the next layer.

For example, convolution is defined by two main parameters: an input feature map and a kernel. The parameters may include an input feature map, an output feature map, an activation map, weights, a kernel, and attention (Q, K, V), etc.

Convolution slides a kernel window over the input feature map. The step size at which the kernel slides over the input feature map is called the stride.

After convolution, pooling may be applied. Also, an FC (fully-connected) layer may be placed at the end of the convolutional neural network.

Figure 2B:
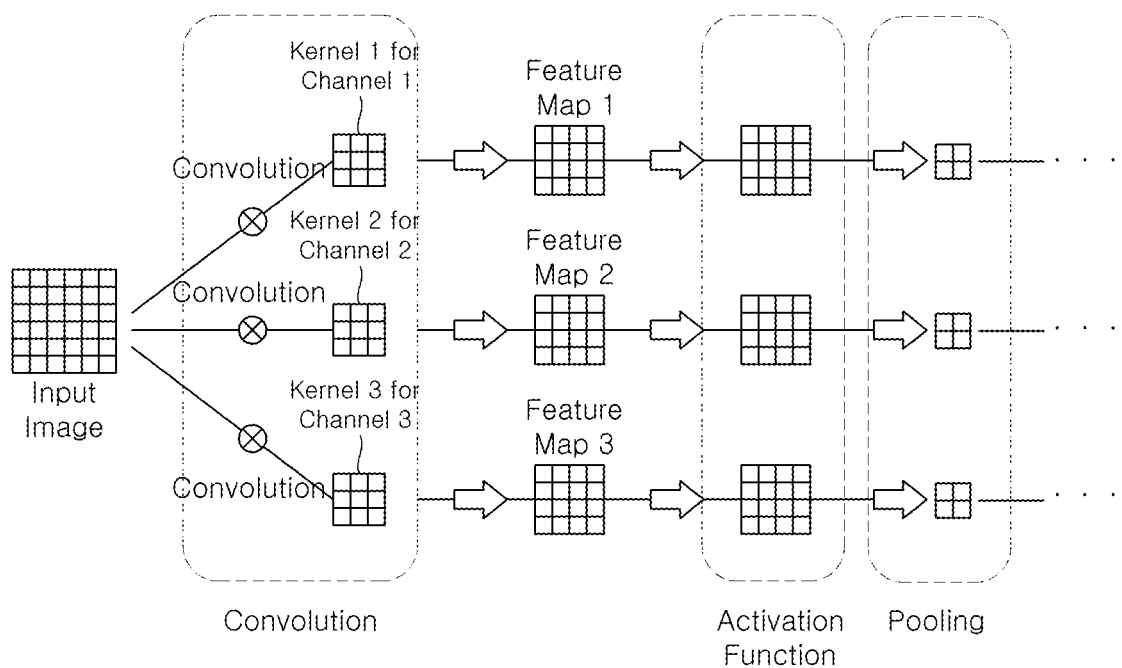
FIG. 2B is a comprehensive diagram illustrating the operation of a convolutional neural network for easy understanding.

FIG. 2B is a comprehensive diagram illustrating the operation of a convolutional neural network for easy understanding.

Referring to FIG. 2B, an input image is exemplarily shown as a two-dimensional matrix with a size of 6×6. In addition, FIG. 2B exemplarily shows that three nodes, namely channel 1, channel 2, and channel 3, are used.

First, the convolution operation will be described.

The input image (exemplarily shown as 6×6 in FIG. 2B) is convolved with kernel 1 for channel 1 at the first node (exemplarily shown as 3×3 in FIG. 2B), and as a result, feature map 1 (exemplarily shown as 4×4 in FIG. 2B) is output. In addition, the input image (exemplarily shown as 6×6 in FIG. 2B) is convolved with kernel 2 for channel 2 at the second node (exemplarily shown as 3×3 in FIG. 2B), and as a result, feature map 2 (exemplarily shown as 4×4 in FIG. 2B) is output. In addition, the input image is convolved with kernel 3 for channel 3 at the third node (exemplarily shown as 3×3 in FIG. 2B), and as a result, feature map 3 (exemplarily shown as 4×4 in FIG. 2B) is output.

To process each convolution, the processing elements (PE1 to PE12) of the neural processing unit 100 are configured to perform MAC operations.

Next, the operation of the activation function will be described.

An activation function can be applied to feature map 1, feature map 2, and feature map 3 (each size is exemplarily shown as 4×4 in FIG. 2B) output from the convolution operation. The output after the activation function is applied may be of size 4×4, for example.

Next, the pooling operation will be described.

Feature map 1, feature map 2, and feature map 3 (each size is exemplarily shown as 4×4 in FIG. 2B) output from the activation function are input to three nodes. Pooling can be performed by receiving the feature maps output from the activation function as input. The pooling can reduce the size or emphasize a specific value in a matrix. Pooling methods include max pooling, average pooling, and min pooling. Max pooling is used to collect the maximum value of a value within a specific area of a matrix, and average pooling can be used to find the average within a specific area.

In the example of FIG. 2B, a 4×4 feature map is shown to be reduced to 2×2 by pooling.

Specifically, the first node receives feature map 1 for channel 1 as input, performs pooling, and outputs a 2×2 matrix, for example. The second node receives feature map 2 for channel 2 as input, performs pooling, and outputs a 2×2 matrix, for example. The third node receives feature map 3 for channel 3 as input, performs pooling, and outputs a 2×2 matrix, for example.

The aforementioned convolution, activation function, and pooling are repeated, and finally, it can be output as a fully connected layer as in FIG. 8a. The corresponding output can be input again to an artificial neural network for image recognition. However, the present disclosure is not limited to the size of the feature map and kernel.

The CNN described so far is the most widely used method in the field of computer vision among various deep neural network (DNN) methods. In particular, CNN has shown remarkable performance in various research areas that perform various tasks such as image classification and object detection.

<Hardware Resources Required for ANN Operations>

Figure 3:
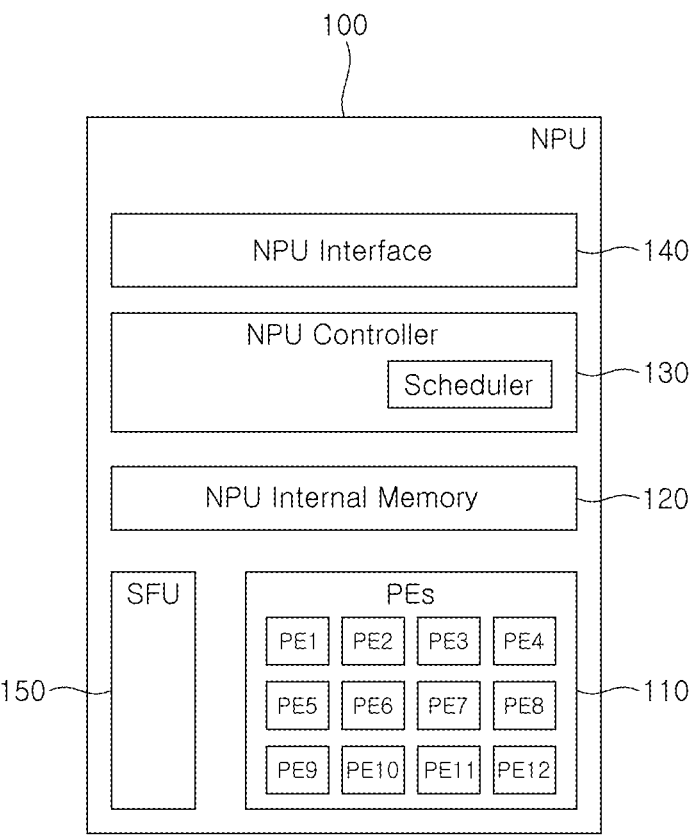
FIG. 3 is a schematic conceptual diagram illustrating a neural processing unit according to an example of the present disclosure.

FIG. 3 is a schematic conceptual diagram illustrating a neural processing unit according to an example of the present disclosure.

The neural processing unit (NPU) 100 shown in FIG. 3 is a processor specialized to perform operations for an artificial neural network.

An artificial neural network is a network of artificial neurons that, when multiple inputs or stimuli are received, multiplies each by a weight and sums them, adds a bias, and transforms the value through an activation function to transmit it. Such a trained artificial neural network can be used to output inference results from input data.

The neural processing unit 100 may be a semiconductor implemented with an electrical/electronic circuit. An electrical/electronic circuit may mean that it includes numerous electronic devices (e.g., transistors, capacitors).

In the case of a Transformer and/or CNN-based neural network model, the neural processing unit 100 can selectively process matrix multiplication operations, convolution operations, etc., according to the architecture of the artificial neural network.

For example, in each layer of a convolutional neural network (CNN), the input feature map corresponding to the input data and the kernel corresponding to the weights can be a tensor or matrix composed of multiple channels. A convolution operation of the input feature map and the kernel is performed, and an output feature map is generated from the convolution operation and pooling in each channel. An activation map of the corresponding channel is generated by applying an activation function to the output feature map. Subsequently, pooling for the activation map can be applied. Here, the activation map can be broadly referred to as an output feature map. For convenience of explanation, the activation map will be referred to as an output feature map below.

However, the examples of the present disclosure are not limited thereto, and the output feature map means that a matrix multiplication operation or a convolution operation has been applied.

To further explain, the output feature map according to the examples of the present disclosure should be interpreted in a comprehensive sense. For example, the output feature map may be the result of a matrix multiplication operation or a convolution operation. Accordingly, it is also possible for the plurality of processing elements 110 to be modified to further include a processing circuit unit for an additional algorithm. That is, it is also possible for some circuit units of the SFU 150, which will be described later, to be configured to be included in the plurality of processing elements 110.

The neural processing unit 100 may be configured to include a plurality of processing elements 110 for processing the convolution and matrix multiplication required for the above-described artificial neural network operations.

The neural processing unit 100 may be configured to include respective processing circuits optimized for matrix multiplication operations, convolution operations, activation function operations, pooling operations, stride operations, batch normalization operations, skip connection operations, concatenation operations, quantization operations, clipping operations, and padding operations necessary for the artificial neural network operations described above.

For example, the neural processing unit 100 may be configured to include an SFU 150 for processing at least one of the activation function operation, pooling operation, stride operation, batch normalization operation, skip connection operation, concatenation operation, quantization operation, clipping operation, and padding operation among the algorithms described above.

Specifically, the neural processing unit 100 may include a plurality of processing elements (PE) 110, an SFU 150, an NPU internal memory 120, an NPU controller 130, and an NPU interface 140. Each of the plurality of processing elements 110, the SFU 150, the NPU internal memory 120, the NPU controller 130, and the NPU interface 140 may be a semiconductor circuit in which numerous transistors are connected. Therefore, some of them may be difficult to identify and distinguish with the naked eye and can only be identified by their operation.

For example, an arbitrary circuit may operate as a plurality of processing elements 110 or as an NPU controller 130. The NPU controller 130 may be configured to perform the function of a control unit configured to control the artificial neural network inference operation of the neural processing unit 100.

The neural processing unit 100 may include an NPU internal memory 120 configured to store parameters of a neural network model that can be inferred in the plurality of processing elements 110 and the SFU 150, and an NPU controller 130 configured to control the operation schedule of the plurality of processing elements 110, the SFU 150, and the NPU internal memory 120.

The neural processing unit 100 may be configured to process a feature map corresponding to an encoding and decoding method using scalable video coding (SVC) or scalable feature-map coding (SFC). The above methods are technologies that variably change the data transmission amount according to the effective bandwidth and signal-to-noise ratio (SNR) of a communication channel or communication bus. That is, the neural processing unit 100 may be configured to further include an encoder and a decoder.

The plurality of processing elements 110 can perform a part of the operations for the artificial neural network.

The SFU 150 can perform another part of the operations for the artificial neural network.

The neural processing unit 100 can be configured to accelerate the operation of a neural network model in hardware using the plurality of processing elements 110 and the SFU 150.

The NPU interface 140 can communicate with various components connected to the neural processing unit 100 through a system bus, for example, a memory.

The NPU controller 130 may be configured to control the operation of the plurality of processing elements 110 for the inference operation of the neural processing unit 100, the operation of the SFU 150, and the read and write sequence of the NPU internal memory 120. For example, the NPU controller 130 may be configured to schedule the neural network operation or to control each circuit part of the neural processing unit 100 according to the scheduled order.

The NPU controller 130 may be configured to control the plurality of processing elements 110, the SFU 150, and the NPU internal memory 120 based on the data locality information or structure information of the neural network model.

The NPU controller 130 can analyze the structure of the neural network model to be operated in the plurality of processing elements 110 and the SFU 150, or be provided with already analyzed information. The analyzed information may be information generated by a compiler. For example, the data of the artificial neural network that the neural network model may include may include at least some of node data (i.e., feature map) of each layer, batch data of layers, locality information or structure information, and weight data (i.e., weight kernel) of each connection network connecting the nodes of each layer. The data of the artificial neural network may be stored in a memory provided inside the NPU controller 130 or in the NPU internal memory 120. However, it is not limited to this, and the data of the artificial neural network may be stored in a separate cache memory or register file provided in the NPU or the SoC (System on Chip) including the NPU.

The NPU controller 130 can schedule the operation sequence of the neural network model to be performed by the neural processing unit 100 based on the data locality information or structure information of the neural network model.

The NPU controller 130 can be provided with scheduling information of the operation sequence of the neural network model to be performed by the neural processing unit 100 based on the compiled data locality information or structure information of the neural network model. For example, the scheduling information may be information generated by a compiler. The scheduling information generated by the compiler may be referred to as machine code or binary code.

That is, the scheduling information used by the NPU controller 130 may be information generated by a compiler based on the data locality information or structure of the neural network model.

To elaborate, a compiler can efficiently schedule the NPU depending on how well it understands and reconstructs the artificial neural network data locality, which is a unique characteristic of the neural network model.

To elaborate, a compiler can efficiently schedule the NPU depending on how well it understands the hardware structure and performance of the neural processing unit 100.

To elaborate, when a neural network model is compiled to be executed on the neural processing unit 100 by a compiler, the artificial neural network data locality can be reconstructed. The artificial neural network data locality can be reconstructed according to the algorithms applied to the neural network model and the operating characteristics of the processor.

To elaborate, the artificial neural network data locality can be reconstructed according to the way the neural processing unit 100 processes the corresponding neural network model, for example, feature map tiling, and the stationary method of the processing element.

To elaborate, the artificial neural network data locality can be reconstructed according to the number of processing elements of the neural processing unit 100 and the capacity of the internal memory.

To elaborate, the artificial neural network data locality can be reconstructed according to the bandwidth of the memory communicating with the neural processing unit 100.

This is because, due to the factors described above, even when processing the same neural network model, the neural processing unit 100 can determine the order of data required at each clock unit differently.

The compiler can determine the data locality based on the order of operations of the layers, unit convolutions, and/or matrix multiplications of the neural network model, and generate a compiled machine code.

The NPU controller 130 may be configured to utilize the scheduling information included in the machine code.

The NPU controller 130 can obtain the memory address value where the feature map and weight data of the layer of the neural network model are stored based on the scheduling information.

For example, the NPU controller 130 can obtain the memory address value where the feature map and weight data of the layer of the neural network model stored in the memory are stored. Therefore, the NPU controller 130 can fetch the feature map and weight data of the layer of the neural network model to be driven from the main memory and store them in the NPU internal memory 120.

The feature map of each layer may have a corresponding memory address value.

Each weight data may have a corresponding memory address value.

The NPU controller 130 may be provided with scheduling information about the operation order of the plurality of processing elements 110 based on the data locality information or structure information of the neural network model, for example, the batch data of the layers of the artificial neural network of the neural network model, the locality information, or the structure information. The scheduling information may be generated during the compilation stage.

The NPU controller 130 can operate differently from the general CPU scheduling concept because it operates based on scheduled information based on the data locality information or structure information of the neural network model. General CPU scheduling operates to achieve the best efficiency, considering fairness, efficiency, stability, response time, and so on. That is, it schedules to perform the most processing within the same time, considering priority, operation time, and so on.

Conventional CPUs have used algorithms that schedule tasks considering data such as the priority order of each process and the operation processing time.

In contrast, the NPU controller 130 can control the neural processing unit 100 according to the processing order of the neural processing unit 100 determined based on the data locality information or structure information of the neural network model.

Furthermore, the NPU controller 130 can drive the NPU 100 according to the processing order determined based on the data locality information or structure information of the neural network model and/or the data locality information or structure information of the neural processing unit 100 to be used.

However, the present disclosure is not limited to the data locality information or structure information of the neural processing unit 100.

The NPU controller 130 may be configured to store the data locality information or structure information of the artificial neural network.

That is, the NPU controller 130 can determine the processing order by utilizing at least the data locality information or structure information of the artificial neural network of the neural network model.

Furthermore, the NPU controller 130 can determine the processing order of the neural processing unit 100 by considering the data locality information or structure information of the neural network model and the data locality information or structure information of the neural processing unit 100. In addition, it is also possible to optimize the processing of the neural processing unit 100 according to the determined processing order.

That is, the NPU controller 130 may be configured to operate based on the machine code compiled from the compiler, but in another example, the NPU controller 130 may be configured to include an embedded compiler. According to the above-described configuration, the neural processing unit 100 may be configured to generate machine code by receiving files in the format of various AI software frameworks. For example, AI software frameworks include TensorFlow, PyTorch, Keras, XGBoost, mxnet, DARKNET. ONNX, and so on.

The plurality of processing elements 110 refers to a configuration in which a plurality of processing elements (PE1 to PE12) configured to operate on the feature map and weight data of the artificial neural network are arranged. Each processing element may include a MAC (multiply and accumulate) operator and/or an ALU (Arithmetic Logic Unit) operator. However, the examples according to the present disclosure are not limited thereto.

Each processing element may be configured to selectively further include an additional special function unit to handle additional special functions.

For example, the processing element (PE) may be modified to further include a batch-normalization unit, an activation function unit, an interpolation unit, and so on.

The SFU 150 may include a circuit unit configured to selectively process operations such as activation function operation, pooling operation, stride operation, batch-normalization operation, skip-connection operation, concatenation operation, quantization operation, clipping operation, padding operation, etc., according to the architecture of the artificial neural network. That is, the SFU 150 may include a plurality of special function operation processing circuit units.

Although a plurality of processing elements are exemplarily shown in FIG. 3, it is also possible for a plurality of multipliers and an adder tree implemented as operators to be arranged in parallel to replace the MAC inside one processing element. In this case, the plurality of processing elements 110 may also be referred to as at least one processing element including a plurality of operators.

The plurality of processing elements 110 are configured to include a plurality of processing elements PE1 to PE12. The plurality of processing elements PE1 to PE12 shown in FIG. 3 are just examples for convenience of explanation, and the number of the plurality of processing elements PE1 to PE12 is not limited. The size or number of the plurality of processing elements 110 can be determined by the number of the plurality of processing elements PE1 to PE12. The size of the plurality of processing elements 110 can be implemented in the form of an N×M matrix. Here, N and M are integers greater than 0. The plurality of processing elements 110 can include N×M processing elements. That is, there can be one or more processing elements.

The size of the plurality of processing elements 110 can be designed considering the characteristics of the neural network model in which the neural processing unit 100 operates.

The plurality of processing elements 110 are configured to perform functions such as addition, multiplication, and accumulation required for artificial neural network operations. In other words, the plurality of processing elements 110 may be configured to perform MAC (multiplication and accumulation) operations.

Hereinafter, the first processing element PE1 among the plurality of processing elements 110 will be described as an example.

Figure 4A:
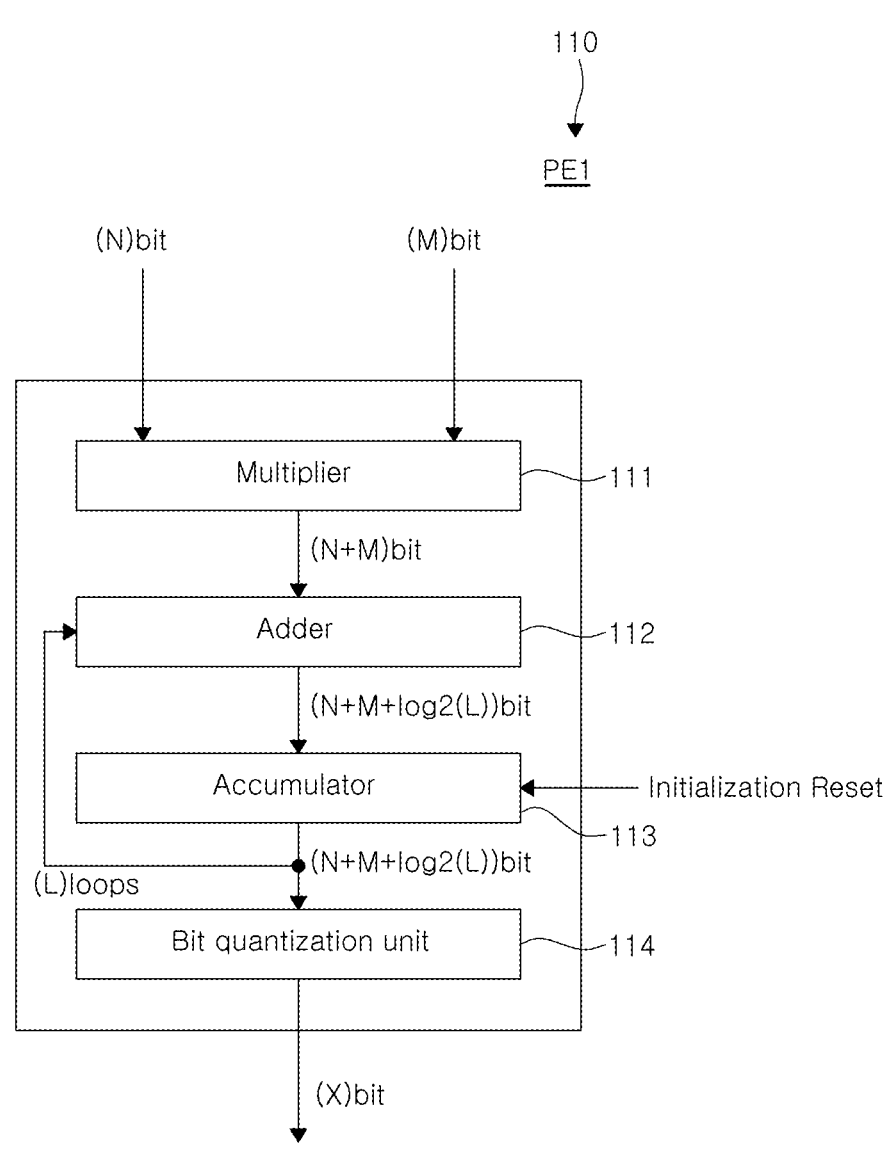
FIG. 4A is a schematic conceptual diagram illustrating one processing element among a plurality of processing elements that can be applied to an example of the present disclosure.

FIG. 4A is a schematic conceptual diagram illustrating one processing element among a plurality of processing elements that can be applied to an example of the present disclosure.

According to an example of the present disclosure, a neural processing unit 100 includes a plurality of processing elements 110, an NPU internal memory 120 configured to store a neural network model that can be inferred by the plurality of processing elements 110, and an NPU controller 130 configured to control the plurality of processing elements 110 and the NPU internal memory 120. The plurality of processing elements 110 are configured to perform a MAC operation, and the plurality of processing elements 110 may be configured to quantize and output the MAC operation result. However, the examples of the present disclosure are not limited thereto.

The NPU internal memory 120 can store all or part of the neural network model depending on the memory size and the data size of the neural network model.

The first processing element PE1 may include a multiplier 111, an adder 112, an accumulator 113, and a bit quantization unit 114. However, the examples according to the present disclosure are not limited thereto, and the plurality of processing elements 110 may be modified in consideration of the operational characteristics of the artificial neural network.

The multiplier 111 multiplies the received (N)bit data and (M)bit data. The operation value of the multiplier 111 is output as (N+M)bit data.

The multiplier 111 may be configured to receive one variable and one constant.

Here, when the value of the parameter is 0 at one of the first input unit and the second input unit of the multiplier 111, the multiplier Ill may be configured to operate in a zero skipping manner. In this case, when the multiplier 111 receives a weight parameter or a feature map parameter with a value of 0, it can deactivate the multiplier 111. Therefore, the multiplier 11 can be configured to reduce the power consumption of the plurality of processing elements 110 when processing a weight parameter to which a pruning algorithm is applied or when the value of a feature map parameter is 0. Therefore, the processing element including the multiplier 111 can be deactivated.

The accumulator 113 accumulates the operation value of the multiplier 111 and the operation value of the accumulator 113 using the adder 112 for (L)loops times. Therefore, the bit width of the data at the output and input of the accumulator 113 can be output as (N+M+log 2(L))bit. Here, L is an integer greater than 0.

When the accumulation is finished, the accumulator 113 can receive an initialization reset signal to initialize the data stored in the accumulator 113 to 0. However, the examples according to the present disclosure are not limited thereto.

The bit quantization unit 114 can reduce the bit width of the data output from the accumulator 113. The bit quantization unit 114 can be controlled by the NPU controller 130. The bit width of the quantized data can be output as (X)bit. Here, X is an integer greater than 0. According to the above configuration, the plurality of processing elements 110 are configured to perform MAC operations, and the plurality of processing elements 110 have the effect of being able to quantize and output the MAC operation results. In particular, this quantization has the effect of further reducing power consumption as (L)loops increases. In addition, when power consumption is reduced, heat generation can also be reduced. In particular, reducing heat generation has the effect of reducing the possibility of malfunction due to the high temperature of the neural processing unit 100.

The output data (X)bit of the bit quantization unit 114 can be the node data of the next layer or the input data of the convolution. If the neural network model is quantized, the bit quantization unit 114 can be configured to receive the quantized information from the neural network model. However, it is not limited to this, and the NPU controller 130 may be configured to analyze the neural network model and extract the quantized information. Therefore, the output data (X)bit can be converted to the quantized bit width corresponding to the quantized data size and output. The output data (X)bit of the bit quantization unit 114 can be stored in the NPU internal memory 120 with the quantized bit width.

The plurality of processing elements 110 of the neural processing unit 100 according to an example of the present disclosure include a multiplier 111, an adder 112, and an accumulator 113. The bit quantization unit 114 can be selectively adopted depending on whether quantization is applied. In another example, the bit quantization unit may be configured to be included in the SFU 150.

Figure 4B:
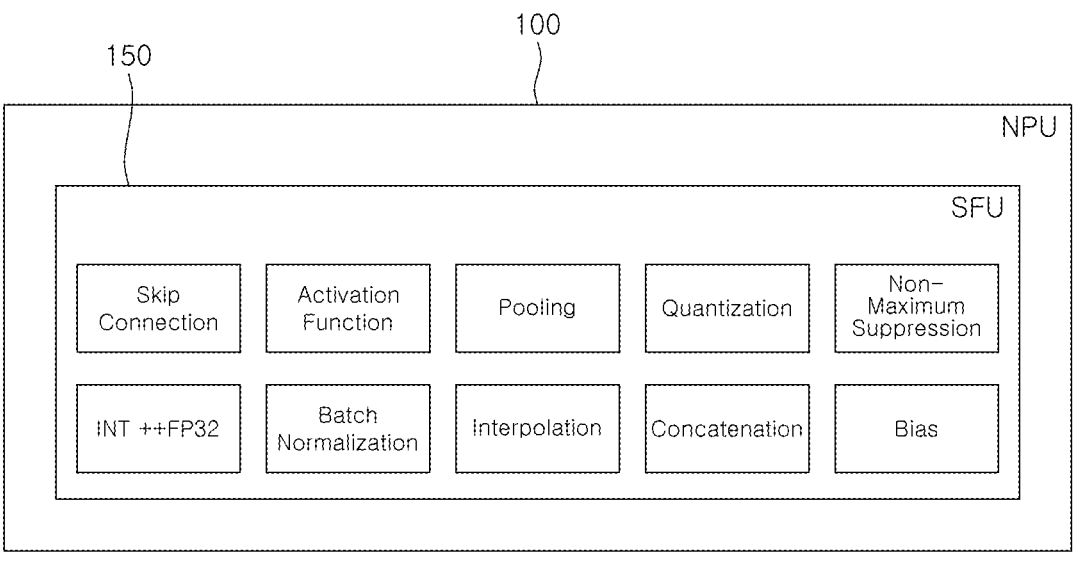
FIG. 4B is a schematic conceptual diagram illustrating an SFU that can be applied to an example of the present disclosure.

FIG. 4B is a schematic conceptual diagram illustrating an SFU that can be applied to an example of the present disclosure.

Referring to FIG. 4B, the SFU 150 includes several functional units. Each functional unit can be selectively operated. Each functional unit can be selectively turned on or turned off. That is, each functional unit is configurable.

In other words, the SFU 150 may include various circuit units necessary for artificial neural network inference operations.

For example, the circuit units of the SFU 150 may include a functional unit for a skip-connection operation, a functional unit for an activation function operation, a functional unit for a pooling operation, a functional unit for a quantization operation, a functional unit for a non-maximum suppression (NMS) operation, a functional unit for an integer and floating-point conversion (INT to FP32) operation, a functional unit for a batch-normalization operation, a functional unit for an interpolation operation, a functional unit for a concatenation operation, and a functional unit for a bias operation.

The functional units of the SFU 150 can be selectively turned on or turned off by the data locality information of the neural network model. The data locality information of the neural network model may include control information related to the turning-off or turning-on of the corresponding functional unit when an operation for a specific layer is performed.

Among the functional units of the SFU 150, the activated unit can be turned on. In this way, when some functional units of the SFU 150 are selectively turned off, the power consumption of the neural processing unit 100 can be reduced. On the other hand, power gating can be used to turn off some functional units. Alternatively, clock gating can also be performed to turn off some functional units.

Figure 5:
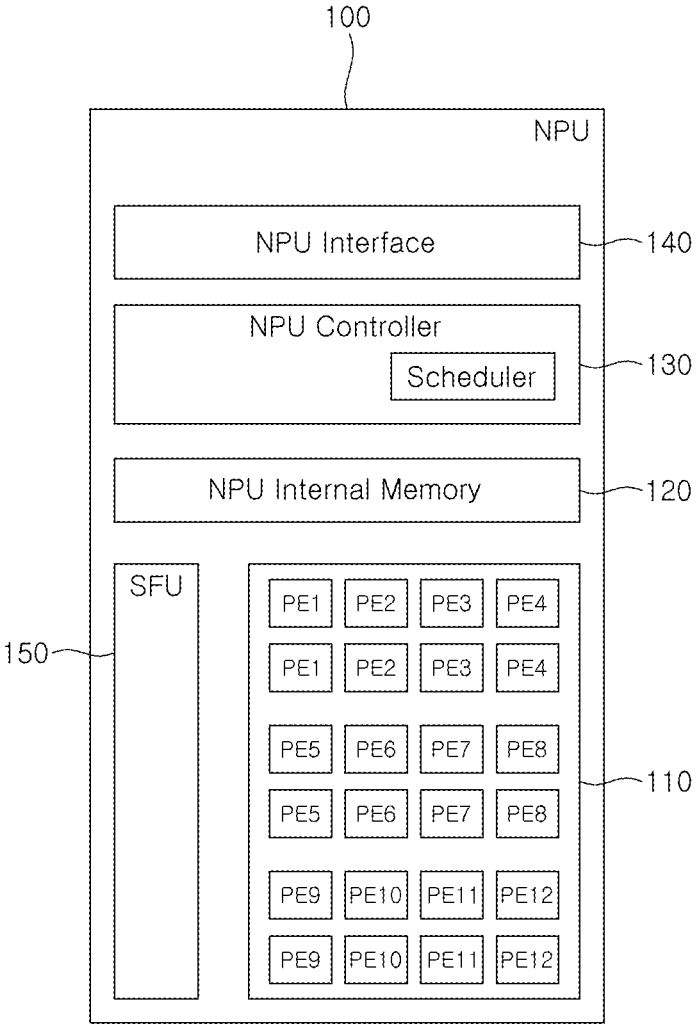
FIG. 5 is an exemplary view showing a modification of the neural processing unit 100 shown in FIG. 3.

FIG. 5 is an exemplary view showing a modification of the neural processing unit 100 shown in FIG. 3.

The neural processing unit 100 shown in FIG. 5 is substantially the same as the processing unit 100 exemplarily shown in FIG. 3, except for the plurality of processing elements 110, so duplicate descriptions may be omitted below for convenience of explanation.

The plurality of processing elements 110 exemplarily shown in FIG. 5 may further include respective register files RF1 to RF12 corresponding to the respective processing elements PE1 to PE12, in addition to the plurality of processing elements PE1 to PE12.

The plurality of processing elements PE1 to PE12 and the plurality of register files RF1 to RF12 shown in FIG. 5 are only examples for convenience of explanation, and the number of the plurality of processing elements PE1 to PE12 and the plurality of register files RF1 to RF12 is not limited.

The size or number of the plurality of processing elements 110 may be determined by the number of the plurality of processing elements PE1 to PE12 and the plurality of register files RF1 to RF12. The size of the plurality of processing elements 110 and the plurality of register files RF1 to RF12 may be implemented in an N×M matrix form. Here, N and M are integers greater than 0.

The array size of the plurality of processing elements 110 can be designed considering the characteristics of the neural network model in which the neural processing unit 100 operates. In addition, the memory size of the register file can be determined considering the data size of the neural network model to be operated, the required operating speed, the required power consumption, and so on.

The register files RF1 to RF12 of the neural processing unit 100 are static memory units directly connected to the processing elements PE1 to PE12. The register files RF1 to RF12 may be composed of, for example, flip-flops and/or latches. The register files RF1 to RF12 may be configured to store the MAC operation values of the corresponding processing elements PE1 to PE12. The register files RF1 to RF12 may be configured to provide or receive weight data and/or node data to and from the NPU internal memory 120.

The register files RF1 to RF12 may also be configured to perform the function of a temporary memory of an accumulator during a MAC operation.

Figure 6:
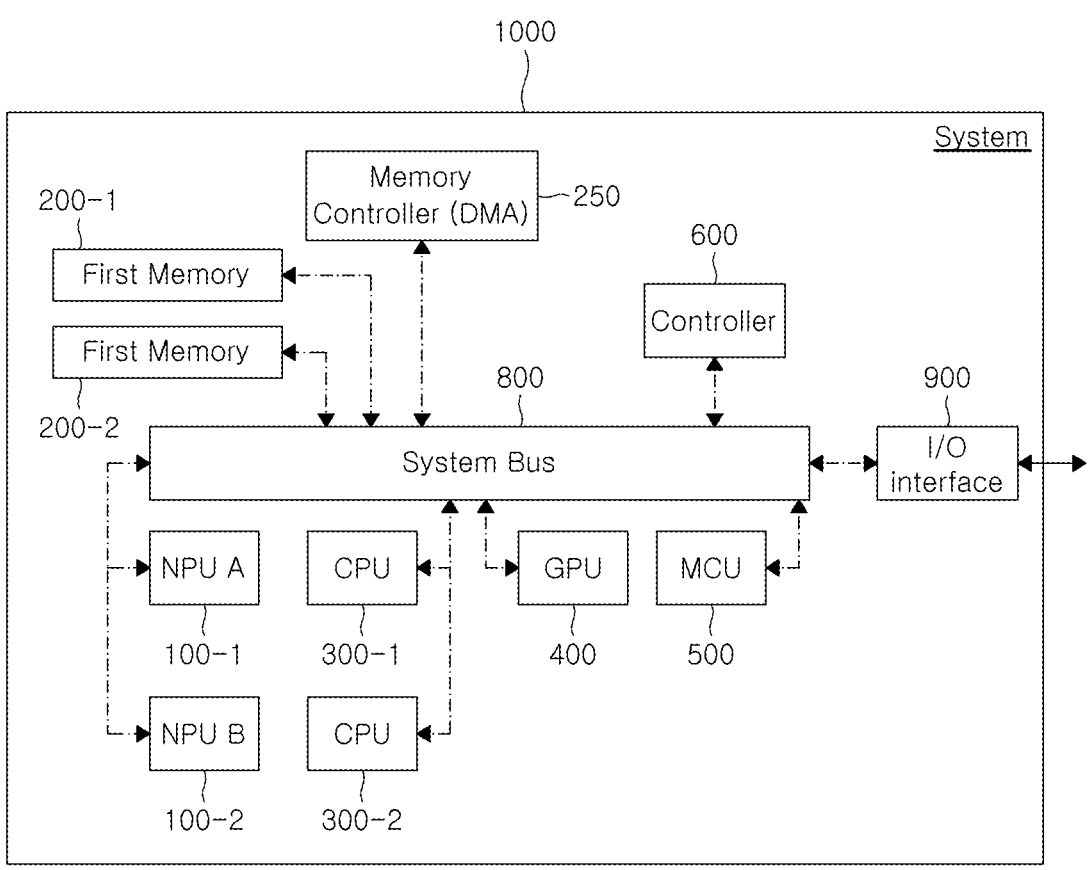
FIG. 6 is a block diagram showing a system according to an example.

FIG. 6 is a block diagram showing a system according to an example.

Referring to FIG. 6, a system 1000 may include one or more NPUs 100-1, 100-2 and one or more memories 200-1, 200-2, a memory controller 250, one or more CPUs 300-1, 300-2, one or more GPUs (graphic processing units) 400, one or more MCUs (Micro Controller Units) 500, a controller 600, a system bus 800, and an U/O (input output) interface 900 mounted on a substrate. Here, the NPU and CPU may be integrated on a single semiconductor chip or implemented as chiplets.

The system bus 800 may be implemented by an electrically conductive pattern formed on the substrate or a semiconductor die. The system bus 800 enables high-speed communication. For example, the one or more NPUs 100-1, 100-2, the one or more memories 200-1, 200-2, the memory controller 250, the one or more CPUs 300-1, 300-2, the one or more GPUs 400, and the one or more MCUs 500 can communicate through the system bus 800.

The one or more NPUs 100-1, 100-2, the one or more memories 200-1, 200-2, the memory controller 250, the one or more CPUs 300-1, 300-2, the one or more GPUs 400, and the one or more MCUs 500 may be semiconductors implemented with electrical/electronic circuits. That is, the one or more NPUs 100-1, 100-2, the one or more memories 200-1.200-2, the memory controller 250, the one or more CPUs 300-1, 300-2, the one or more GPUs 400, and the one or more MCUs 500 may be semiconductor circuits in which numerous electronic devices (e.g., transistors, capacitors) are connected.

The one or more NPUs 100-1, 100-2, the one or more memories 200-1, 200-2, the memory controller 250, the one or more CPUs 300-1, 300-2, the one or more GPUs 400, and the one or more MCUs 500 request the memory controller 250 through the system bus 800. Accordingly, the memory controller 250 can read data from or write data to at least one of the plurality of memories 200-1, 200-2.

Among the plurality of NPUs, the first NPU 100-1 may be a type A NPU, and the second NPU 100-2 may be a type B NPU.

And among the plurality of CPUs, the first CPU 300-1 may be an X86 architecture-based CPU, and the second CPU 300-2 may be an ARM architecture-based CPU. According to another example, the first CPU 300-1 may be an ARM architecture-based CPU, and the second CPU 300-2 may be an X86 architecture-based CPU or a RISC-V architecture-based CPU.

Meanwhile, the system 1000 may be implemented in the form of a SoC (system on chip). An SoC refers to a semiconductor that incorporates an entire system on a single chip, and is a technology in which major semiconductor devices such as computing, memory, and data conversion devices are implemented on a single chip. An SiP (System in Package) refers to a semiconductor that incorporates an entire system in a single package, and is a technology in which major semiconductor devices such as computing, memory, and data conversion devices are implemented in a single package.

Figure 7:
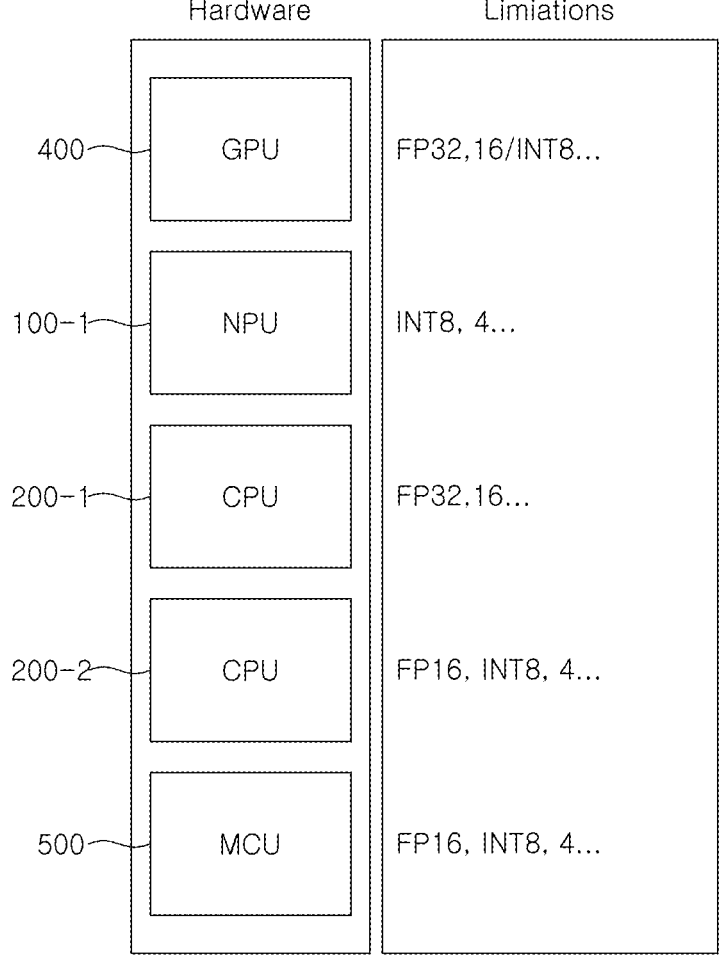
FIG. 7 is an exemplary view showing constraints of the system shown in FIG. 6.

FIG. 7 is an exemplary view showing constraints of the system shown in FIG. 6.

As shown in FIG. 7, let's assume that the GPU 400 can only process 32-bit floating point (FP32), 16-bit floating point (FP16), and 8-bit integer (INT8). On the other hand, let's assume that the first NPU 100-1 can only process 8-bit integer (INT8) and 4-bit integer (INT4). And, let's assume that the first CPU 300-1 can only process 32-bit floating point (FP32) and 16-bit floating point (FP16). Also, let's assume that the second CPU 300-2 can only process 16-bit floating point (FP16), 8-bit integer (INT8), and 4-bit integer (INT4). And, let's assume that the MCU 500 can only process 16-bit floating point (FP16), 8-bit integer (INT8), and 4-bit integer (INT4).

<Technical Difficulty Found by the Inventor>

Let's assume that each hardware has these constraints. When a neural network model is provided, the inventor of the present disclosure recognized that it is not technically clear which hardware should process the neural network model to achieve optimal performance. This will be explained in detail as follows.

A neural network model is a neural network model trained without considering the hardware characteristics of the system. That is, the neural network model was trained without considering the hardware limitations of the system. Therefore, when processing the neural network model, the processing performance in the system 1000 may not be optimized. For example, the performance degradation may be due to inefficient memory management and the processing of a vast amount of computation of the neural network model. Therefore, the system 1000 processing the neural network model may require high power consumption or have a low computational processing speed problem.

Therefore, a technology is needed that can recognize the performance limits of each hardware within the system 1000 and process the neural network model with optimal performance.

Figure 8:
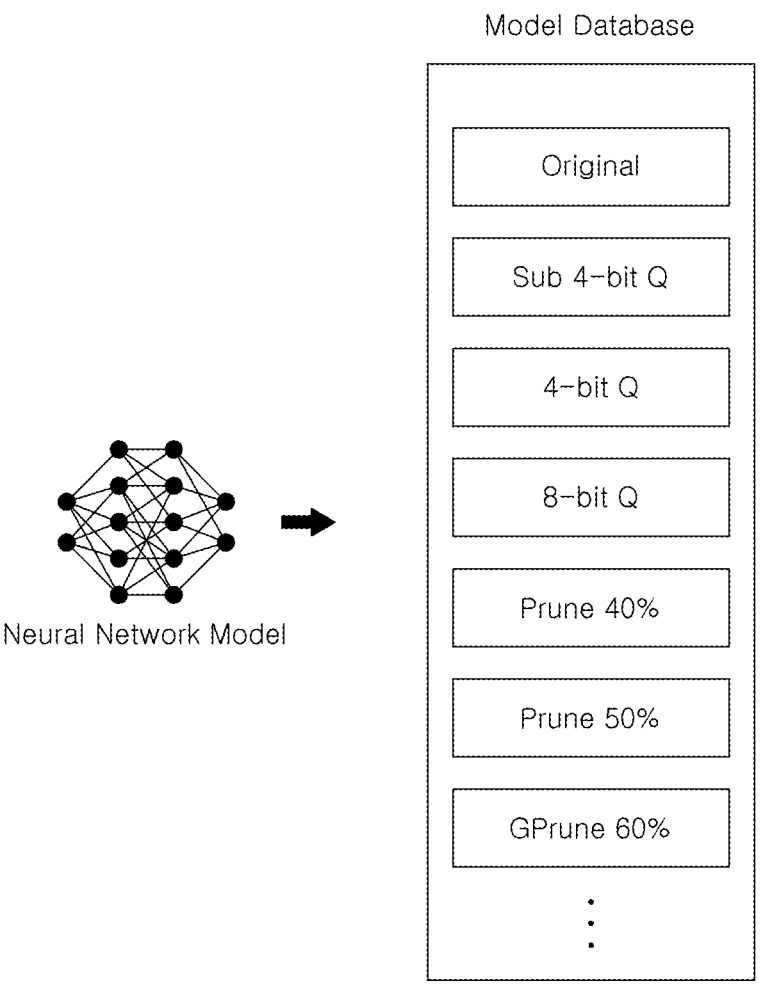
FIG. 8 illustrates an example of lightening, i.e., compressing, a neural network model.

FIG. 8 illustrates an example of lightening, i.e., compressing, a neural network model.

The neural network model shown in FIG. 8 may have a bit-width of 32 bits, for example. That is, the kernels (i.e., matrices including weights) included in the layers within the neural network model may have a 32-bit width.

When a neural network model is input, the original neural network model including 32-bit width kernels may be stored in a database. Also, the neural network model including the 32-bit width kernels may be quantized to a bit-width of 4 bits or less (sub 4-bit Quantization) and then stored in the database. Also, the neural network model including the 32-bit width kernels may be quantized to a 4-bit width (4-bit Quantization) and then stored in the database. Similarly, the 32-bit width neural network model may be quantized to an 8-bit width (8-bit Quantization) and then stored in the database.

Next, the neural network model can be pruned. The pruning technique is a technology that can reduce the amount of computation of a neural network model. Pruning can be configured to replace small values close to 0 with 0 among the weight data and/or weight kernels of all layers of the artificial neural network model. When a specific weight data is replaced with 0 by the pruning technique, the pruning technique can provide a substantially same effect as disconnecting the connection network of the neural network model having the corresponding weight data. That is, the multiplication operation related to the weight replaced with 0 can be skipped. Therefore, the operation speed of convolution can be improved and power consumption can be reduced, and the parameter size of the machine code of the neural network model to which the pruning technique is applied can be reduced. Pruning techniques can be classified into a first pruning technique based on magnitude, which removes weights with small magnitudes, and a second pruning technique based on percentage, which removes a certain percentage of the smallest weights.

FIG. 8 shows a plan to replace 40% of the total weights with 0 (Prune 40%), a plan to replace 50% of the total weights with 0 (Prune 50%), and a plan to replace 60% of the total weights with 0 (Prune 60%).

Table 1 below shows the loss rate according to each lightening (i.e., compression) scheme when lightening, i.e., compressing, a neural network model.

TABLE 1

| Loss Rate | Lightening (Compression) Scheme |
| --- | --- |
| Convolution Layer 1 | |
| 0 | Original base |
| 0.013763 | 4-bit quantization |
| 0.013896 | 8-bit quantization |

TABLE 1-continued

| Loss Rate | Lightening (Compression) Scheme |
|---|---|
| Layer 1 | |
| 0 | Original base |
| 0.006164 | 4-bit quantization |
| 0.006199 | 8-bit quantization |

For example, when the kernels (i.e., matrices including weights) included in the layers within the neural network model have a 32-bit width, the loss rate is 0 on the original basis without performing quantization.

In the table above, when the 32-bit width neural network model is quantized to a 4-bit width (4-bit Quantization), a loss rate of 0.013763 means that the accuracy is 0.013763 times lower than that of the 32-bit width neural network model. As another example, in the table above, when the 32-bit width neural network model is quantized to an 8-bit width (8-bit Quantization), a loss rate of 0.013896 means that the accuracy is 0.013896 times lower than that of the 32-bit width neural network model.

FIG. 9 illustrates an example of performing lightening (i.e., compression) differently for each layer of a neural network model, according to an embodiment.

Referring to FIG. 9, the kernel of the first layer (Layer #1) in the neural network model (i.e., the matrix including weights) may be used as is without quantization, but for the kernel of the second layer (Layer #2) (i.e., the matrix including weight parameters), 8-bit quantization may be performed, and a plan to replace 50% of the weights with 0 (Prune 50%) may be applied. When the kernel of each layer of the original neural network model is a 32-bit floating-point number, if 8-bit quantization is performed on the kernel, the kernel is converted to an 8-bit integer (INT 8).

For the kernel of the third layer (Layer #3) (i.e., the matrix including weight parameters), 4-bit quantization may be performed. When the kernel of each layer of the original neural network model is a 32-bit floating-point number, if 4-bit quantization is performed on the kernel, the kernel is converted to a 4-bit integer (INT 4).

The kernel of the fifth layer (Layer #5) (i.e., the matrix including weight parameters) may be quantized to a bit-width of 4 bits or less (sub 4-bit Quantization), and then a plan to replace 40% of the weights with 0 (Prune 40%) may be applied.

For the kernel of the sixth layer (Layer #6) (i.e., the matrix including weight parameters), 8-bit quantization may be performed.

The kernel of the seventh layer (Layer #7) (i.e., the matrix including weight parameters) may be quantized to a bit-width of 4 bits or less (sub 4-bit Quantization).

For the kernel of the eighth layer (Layer #8) (i.e., the matrix including weight parameters), instead of being quantized, a plan to replace 60% of the weights with 0 (Prune 60%) may be applied.

As described, the inventor of the present disclosure recognized that when applying lightening (i.e., compression) techniques differently for each layer, it is not technically clear which hardware in the system should process which layer to achieve optimal performance.

Therefore, the present disclosure aims to present a technology that can process a neural network model with optimal performance by considering the performance limits of each hardware within the system 1000 and also considering that lightening techniques are applied differently for each layer within the neural network model.

Figure 10:
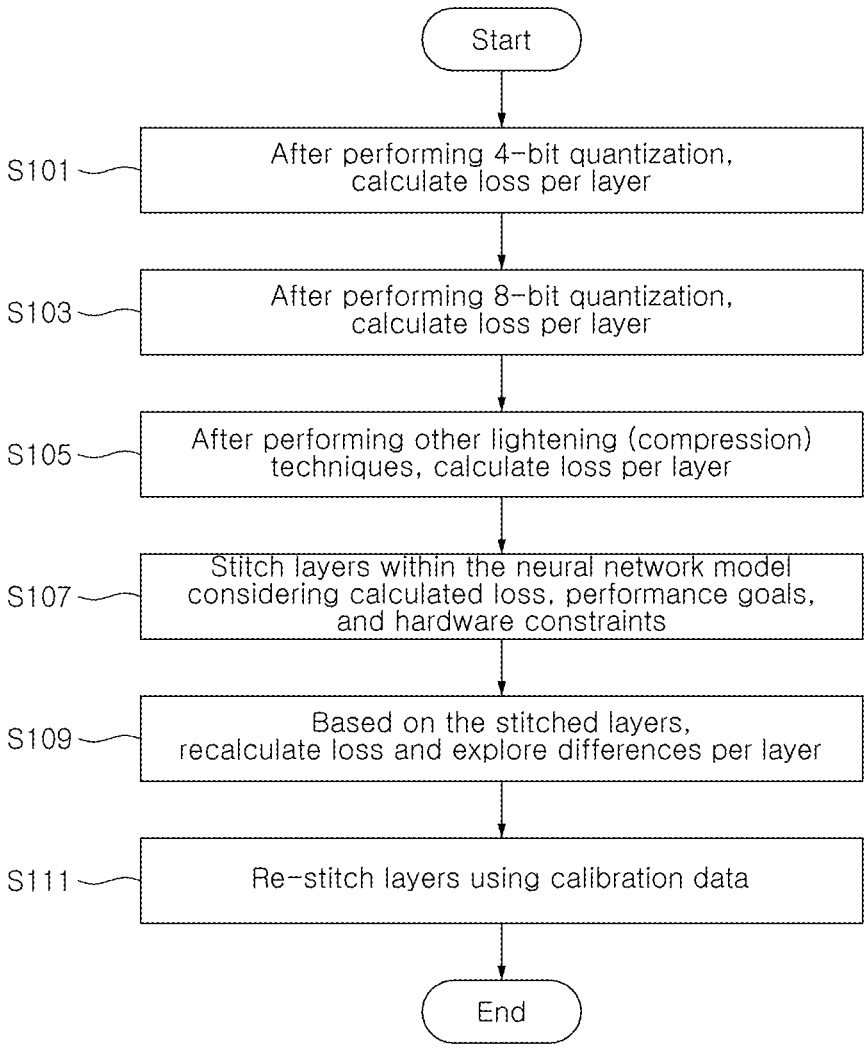
FIG. 10 is an exemplary flowchart showing a procedure according to a disclosure.

FIG. 10 is an exemplary flowchart showing a procedure according to a disclosure.

Referring to FIG. 10, 4-bit quantization is performed on the kernel (i.e., the matrix including weights) of each layer of the neural network model, and the loss per layer is calculated S101. If the kernel of each layer of the original neural network model is a 32-bit floating-point number, when 4-bit quantization is performed, the kernel is converted to a 4-bit integer (INT 4).

Next, 8-bit quantization is performed on the kernel (i.e., the matrix including weights) of each layer of the neural network model, and the loss per layer is calculated S103. If the kernel of each layer of the original neural network model is a 32-bit floating-point number, when 8-bit quantization is performed, the kernel is converted to an 8-bit integer (INT 8).

Next, after another lightening (compression) technique is performed, the loss per layer can be calculated S105. The other lightening (compression) technique may include a pruning technique.

In step S107, the layers within the neural network model can be stitched together, considering the loss calculated in step S105, the performance goal, and the hardware constraints.

According to an embodiment, the performance goals may include processing time, accuracy, computational load, heat generation, and the like. Processing time refers to the time it takes to produce an output after receiving an input, and fast processing time is important in many real-time applications. Accuracy indicates how accurate predictions are, and high accuracy is important for making reliable decisions. Computational load refers to the total computational resources required to operate, which is a particularly important consideration in environments with limited hardware resources.

According to an embodiment, the hardware constraints refer to the data that can be processed by the first NPU 100-1, the second NPU 100-2, the first CPU 300-1, the second CPU 300-2, the GPU 400, and the MCU 500 in the system 1000, as described above with reference to FIG. 7. That is, as described above, 32-bit floating point (FP32) can only be processed by the first CPU 300-1 and the GPU 400. 16-bit floating point (FP16) can only be processed by the first CPU 300-1, the second CPU 300-2, the MCU 500, and the GPU 400. In addition, 8-bit integer (INT8) can only be processed by the first NPU 100-1, the second NPU 100-2, the second CPU 300-2, the GPU 400, and the MCU 500. 4-bit integer (INT4) can only be processed by the first NPU 100-1, the second NPU 100-2, the second CPU 300-2, the GPU 400, and the MCU 500.

For example, to prevent a decrease in accuracy, layers with the minimum loss rate compared to the original layer can be selected as candidates.

Subsequently, for the computational load and FPS (frame per second), the layers showing the minimum loss rate can be combined.

When a model is created by combining the layers, the loss rate is reviewed again, and the above steps are repeated to perform optimization.

That is, the loss is recalculated based on the combined layers, and the difference per layer is explored S109.

Finally, the layers are recombined using calibration data S111.

Figure 11:
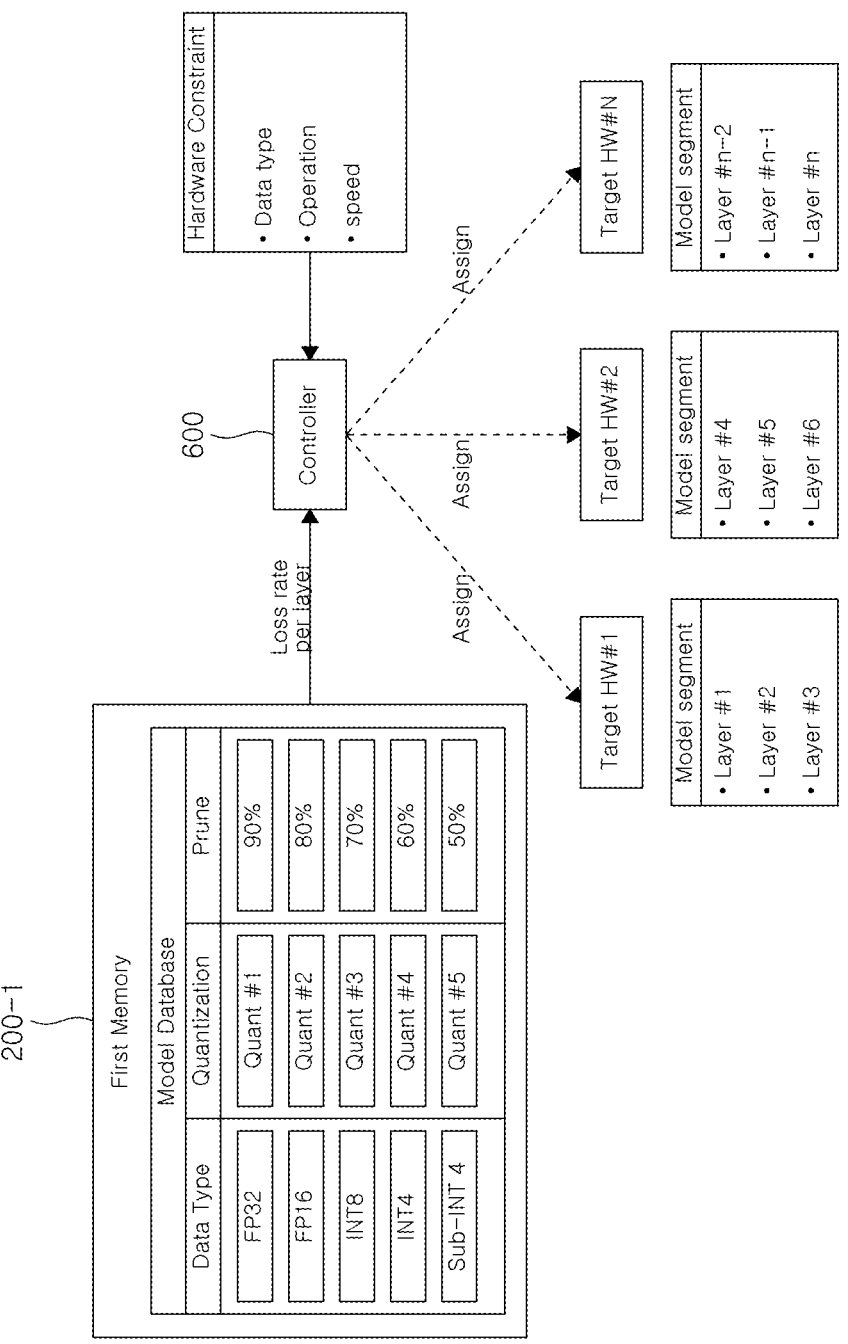
FIG. 11 illustrates an example in which the operations for each layer of a neural network model are assigned to hardware according to the procedure shown in FIG. 10.

Considering the calculated loss, performance goals, and hardware constraints, hardware allocation for the operations of each layer of the neural network model can be performed as shown in FIG. 11.

FIG. 11 illustrates an example in which the operations for each layer of a neural network model are assigned to hardware according to the procedure shown in FIG. 10.

As can be seen by referring to FIG. 11, the model database may be stored in the first memory 200-1 or the second memory 200-2. The controller 600 in the system 1000 can calculate the loss rate per layer from the model database in the first memory 200-1 or the second memory 200-2. Then, the controller 600 can obtain information about hardware constraints.

Then, the controller 600 can assign the operation per layer to the hardware.

FIG. 12 illustrates an example in which the operations for each layer of a neural network model are assigned to hardware according to the procedure shown in FIG. 10.

As can be seen by referring to FIG. 12, the kernel of the first layer (Layer #1) (i.e., the matrix including weight parameters) may not have a lightening (compression) technique applied, and may include 32-bit floating point (FP32). For the kernel of the second layer (Layer #2) (i.e., the matrix including weight parameters), 8-bit quantization is performed, converted to 8-bit integer (INT8), and then a plan to replace 80% of the weights with 0 (Prune 80%) may be applied. The kernel of the third layer (Layer #3) (i.e., the matrix including weight parameters) may be converted to 8-bit integer (INT8) by performing 8-bit quantization. For the kernel of the fourth layer (Layer #4) (i.e., the matrix including weight parameters), 4-bit quantization is performed, converted to 4-bit integer (INT4), and then a plan to replace 70% of the weights with 0 (Prune 70%) may be applied. For the kernel of the fifth layer (Layer #5) (i.e., the matrix including weight parameters), a conversion to 16-bit floating point (FP16) may be performed. The kernel of the sixth layer (Layer #6) (i.e., the matrix including weight parameters) may not have a lightening (compression) technique applied, and may include 32-bit floating point (FP32).

The operations for these first to sixth layers can be assigned to the GPU 400.

For the kernel of the seventh layer (Layer #7) (i.e., the matrix including weight parameters), 4-bit quantization may be performed and converted to 4-bit integer (INT4). For the kernel of the eighth layer (Layer #8) (i.e., the matrix including weight parameters), 4-bit quantization is performed, converted to 4-bit integer (INT4), and then a plan to replace 80% of the weights with 0 (Prune 80%) may be applied. The kernel of the ninth layer (Layer #9) (i.e., the matrix including weight parameters) may be converted to 8-bit integer (INT8) by performing 8-bit quantization. For the kernel of the tenth layer (Layer #10) (i.e., the matrix including weight parameters), 8-bit quantization is performed, converted to 8-bit integer (INT8), and then a plan to replace 70% of the weights with 0 (Prune 70%) may be applied. For the kernel of the eleventh layer (Layer #11) (i.e., the matrix including weight parameters), 8-bit quantization is performed, converted to 8-bit integer (INT8), and then a plan to replace 60% of the weights with 0 (Prune 60%) may be applied. The kernel of the twelfth layer (Layer #12) (i.e., the matrix including weight parameters) may be converted to 8-bit integer (INT8) by performing 8-bit quantization.

The operations for these seventh to twelfth layers can be assigned to the first NPU 100-1.

FIG. 13 illustrates an example in which the hardware assigned according to the example of FIG. 12 is changed.

Referring to FIG. 13, when changing from the first NPU 100-1 to the first CPU 300-1, the data type and operation efficiency of the seventh to twelfth layers may also be changed.

Specifically, for the kernel of the seventh layer (Layer #7) (i.e., the matrix including weight parameters), a conversion to 16-bit floating point (FP16) may be performed. For the kernel of the eighth layer (Layer #8) (i.e., the matrix including weight parameters), 8-bit quantization is performed, converted to 8-bit integer (INT8), and then a plan to replace 80% of the weights with 0 (Prune 80%) may be applied. For the kernel of the ninth layer (Layer #9) (i.e., the matrix including weight parameters), a conversion to 16-bit floating point (FP16) may be performed. For the kernel of the tenth layer (Layer #10) (i.e., the matrix including weight parameters), 8-bit quantization is performed, converted to 8-bit integer (INT8), and then a plan to replace 70% of the weights with 0 (Prune 70%) may be applied. For the kernel of the eleventh layer (Layer #11) (i.e., the matrix including weight parameters), a conversion to 16-bit floating point (FP16) is performed, and then a plan to replace 60% of the weights with 0 (Prune 60%) may be applied. The kernel of the twelfth layer (Layer #12) (i.e., the matrix including weight parameters) may not have a lightening (compression) technique applied, and may include 32-bit floating point (FP32).

The operations for these seventh to twelfth layers can be assigned to the first CPU 300-1.

Hereinafter, an embodiment in which each layer of a neural network model is dynamically assigned to hardware will be described with reference to FIGS. 14 and 15.

Figure 14:
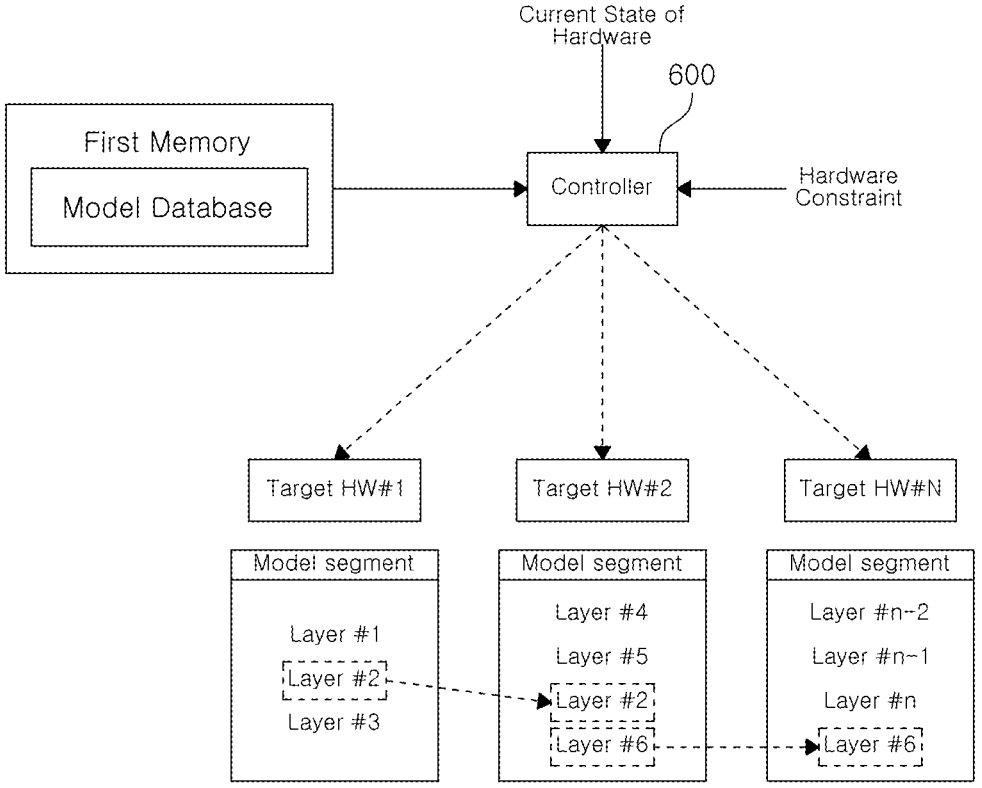
FIG. 14 illustrates a controller assigning layers of a neural network model to hardware, according to an embodiment.

FIG. 14 illustrates applying lightening (i.e., compression) differently for each layer of a neural network model, according to an embodiment. FIG. 15 is a flowchart of a method in which a controller dynamically lightens and assigns a layer of a neural network model to hardware, according to an embodiment.

The embodiment described with reference to FIGS. 14 to 15 differs from the embodiment described with reference to FIGS. 9 to 13 in that the layers of the neural network are dynamically lightened and assigned. Dynamic lightening means that a different lightening method is applied based on an objective function that can change dynamically when actually computing the artificial neural network, and based on the application result, it is assigned to suitable hardware.

The objective function can be designed to minimize at least one of loss due to quantization, power consumed by performing the operation, heat generated by performing the operation, etc., or to maximize the performance goal.

In the objective function below, $L_{task}$ represents the performance loss of the neural network due to lightening, and C(bitwidth) represents the cost to process the lightened neural network. Therefore, optimization can be performed to minimize $L_{total}$ to find the optimal quantization bit-width.

$$L_{total} = L_{task} + \lambda \cdot C(\text{bitwidth}) \qquad \text{[Equation 1]}$$

According to an embodiment, the controller may determine a main target hardware and at least one sub target hardware to perform the operation of the current layer. The main target hardware is the processor corresponding to the bit number that can minimize the objective function among the heterogeneous processors in the system 1000. The at least one sub target hardware may be the processor corresponding to the bit number that can next minimize the objective function, or a processor corresponding to a bit number determined again by changing the objective function depending on the situation.

For example, the controller 600 may perform INT8 quantization on the parameters of the second layer and perform 80% pruning based on the objective function. A first target hardware (e.g., GPU 400) may be determined as the main target hardware to perform the operation for the second layer. If it is appropriate to assign the operation of the second layer to the first target hardware, the controller 600 may assign the operation of the second layer to the first target hardware. In this embodiment, the controller 600 can optimize the operation performance by readjusting the pruning ratio. For example, while assigning the operation of the second layer to the first target hardware, the pruning ratio may be increased to 90% or decreased to 70%. The controller may increase the pruning ratio when the load of the GPU 400 is high and decrease the pruning ratio when the load of the GPU 400 is low.

The controller 600 may perform INT4 quantization on the parameters of the second layer based on the objective function. A second target hardware (e.g., NPU 100-1) may be determined as the sub target hardware to perform the operation for the second layer.

Referring to FIG. 14, if the controller 600 selects the first target hardware (Target HW #1) as the main target hardware for the second layer and attempts to assign it, but it is not appropriate to assign it to the first target hardware as is, it may assign the operation of the second layer to the sub target hardware, the second target hardware (Target HW #2). The case where it is not appropriate to assign to the first target hardware may include the case where the first target hardware is occupied by another work or an abnormal situation has occurred in the system 1000. An abnormal situation may include cases where the heat generation of the system 1000 is too severe or the remaining battery level is too low. For example, if the internal temperature of the system 1000 is above a reference value or the remaining battery level is below a reference value, it may be judged as an abnormal situation.

For example, for the sixth layer, a second target hardware (Target HW #2, e.g., NPU 100-1) may be determined as the main target hardware, and a third target hardware (Target HW #3, e.g., NPU 100-2) may be determined as the sub target hardware. Referring to FIG. 14, if the controller 600 selects the second target hardware as the main target hardware for the sixth layer and attempts to assign it, but it is not appropriate to assign it to the second target hardware as is, it may assign the operation of the sixth layer to the sub target hardware, the third target hardware (Target HW #3). The case where it is not appropriate to assign to the second target hardware may include the case where the second target hardware is occupied by another work or an abnormal situation has occurred in the system 1000.

Figure 15:
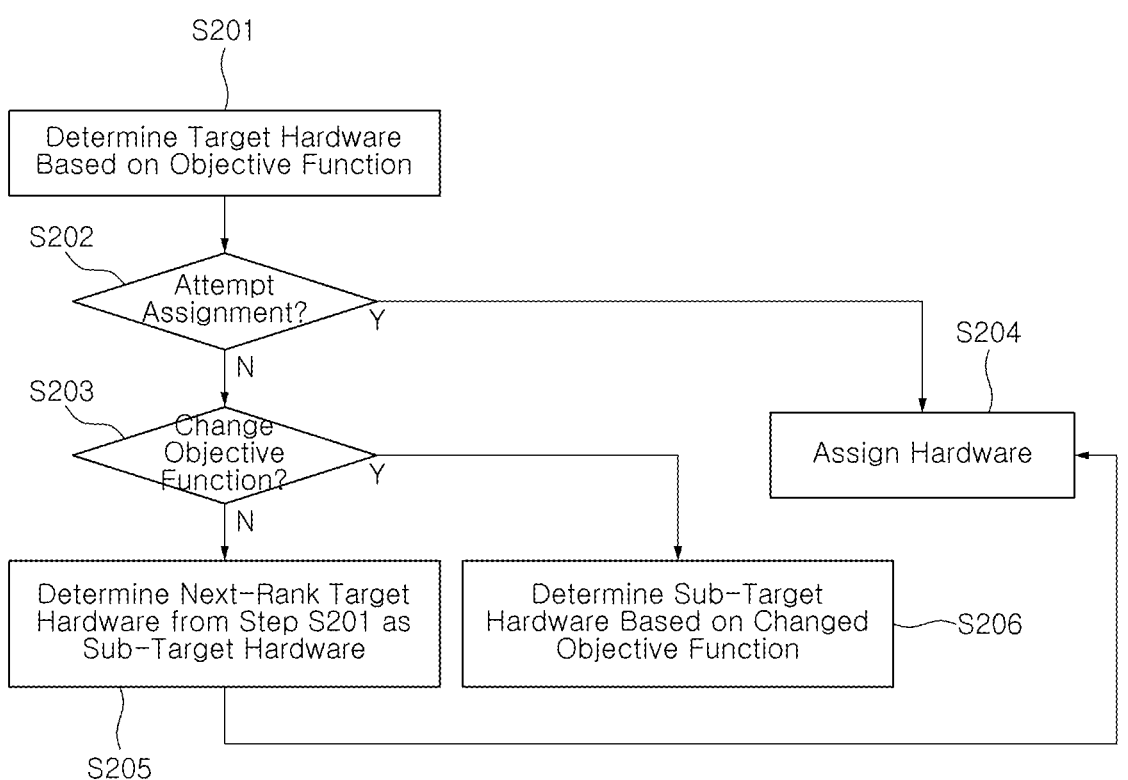
FIG. 15 shows a flowchart of a method in which a controller dynamically assigns layers of a neural network model to hardware, according to an embodiment.

FIG. 15 shows a flowchart of a method in which a controller dynamically determines the target hardware to perform the layer operation of an artificial neural network, according to an embodiment.

In step S201, the controller 600 may determine the target hardware to compute the current layer based on a first objective function. The first objective function can compute the target hardware to compute the layer considering the loss and performance goals. The performance goals may include processing time, accuracy, computational load, heat generation, and the like. Processing time refers to the time it takes to produce an output after receiving an input, and fast processing time is important in many real-time applications. Accuracy indicates how accurate predictions are, and high accuracy is important for making reliable decisions. Computational load refers to the total computational resources required to operate, which is a particularly important consideration in environments with limited hardware resources. According to an embodiment, the first objective function may be set to consider only the trade-off relationship between loss and performance. That is, the optimal quantization bit that can maximize performance with low loss can be determined. The target hardware may be determined based on the quantization bit that minimizes the first objective function. The sub target hardware may be determined based on the quantization bit that second-minimizes the first objective function. The sub target hardware may be used in step S205.

In step S202, the controller 600 may assign the layer's computation process to the target hardware determined in step S201. If the assignment is appropriate (Yes), the current layer's computation process may be assigned to the target hardware determined in step S201 (step S204).

If the assignment is inappropriate (No), the controller 600 may determine whether a change in the objective function is necessary (S203). If a change in the objective function is not necessary, the sub target hardware may be determined as the next-ranked hardware determined based on the first objective function of step S201 (S205). A case where a change in the objective function is not necessary is when the target hardware determined in step S201 is occupied by another process. If a change in the objective function is necessary, the target hardware determined based on a second objective function may be determined as the sub target hardware (S206). A case where a change in the objective function is necessary may be when the system 1000 is overheating or the battery capacity is low.

For example, if the first objective function was to lower the loss and increase the performance goal, the second objective function may be determined to lower the loss and increase the performance goal while minimizing heat generation. For example, if the first objective function was to lower the loss and increase the performance goal, the second objective function may be determined to lower the loss and increase the performance goal while minimizing power consumption. In the second objective function below, $L_{task}$ represents the performance loss of the neural network due to lightening, and C(bitwidth) represents the cost to process the lightened neural network. $P_{power}$ represents power consumption, and $H_{heat}$ represents the degree of heat generation. Therefore, the controller 600 can search for the optimal quantization bit-width by proceeding with optimization to minimize $L_{total}$.

$$L_{total} = L_{task} + \lambda_1 \cdot C_{bit} + \lambda_2 \cdot P_{power} + \lambda_3 \cdot H_{heat} \qquad \text{[Equation 2]}$$

In step S205 or step S206, when the sub target hardware is determined, the computation process of the current layer can be assigned to the sub target hardware S204. According to an embodiment, when the current computation process is assigned to the target hardware, the pruning ratio can be additionally adjusted. For example, if the load of the currently assigned hardware is higher than a reference value, the pruning ratio can be increased to lower the load, and if the load is lower than the reference value, the pruning ratio can be lowered to increase performance. The load can be judged based on the utilization rate of the target hardware, memory usage, etc.

FIG. 16 shows the main target hardware and sub target hardware determined for each layer, according to an embodiment.

The sub target hardware may be the hardware determined as the next rank based on the objective function for determining the main target hardware, or it may be hardware determined based on an objective function different from the objective function for determining the main target hardware.

Referring to FIG. 16, for Layer #1, quantization or pruning techniques may not be applied, and in this case, the operation for Layer #1 may be assigned to the GPU. Layer #1 may have an INT4 quantization technique applied, and in this case, the operation for Layer #1 may be assigned to NPU1. The main target hardware for Layer #1 is the GPU, and the sub target hardware is NPU1.

For Layer #2, INT8 quantization may be performed and an 80% pruning technique may be applied, and in this case, the operation for Layer #2 may be assigned to the GPU. Layer #2 may have an INT4 quantization technique applied, and in this case, the operation for Layer #2 may be assigned to NPU1. The main target hardware for Layer #2 is the GPU, and the sub target hardware is NPU1.

SUMMARY OF EMBODIMENTS

According to an example of the present disclosure, a system is provided. The system may include: a plurality of heterogeneous processors configured to perform inference using a neural network model comprising a plurality of layers; a memory for storing the neural network model, wherein each layer of the neural network model comprises a plurality of parameters having different bit-widths; and a controller for assigning an operation for an arbitrary layer of the neural network model to an arbitrary processor among the plurality of heterogeneous processors. An operation for a first portion of the arbitrary layer of the neural network model may be assigned to a first processor among the plurality of heterogeneous processors. An operation for a second portion of the arbitrary layer of the neural network model may be assigned to a second processor among the plurality of heterogeneous processors. A first bit-width of a first parameter for the first portion and a second bit-width of a second parameter for the second portion may be different from each other.

According to another example of the present disclosure, a System on Chip (SoC) is provided. The SoC may include: a plurality of heterogeneous processors configured to perform inference using a neural network model comprising a plurality of layers; a memory for storing the neural network model, wherein each layer of the neural network model comprises a plurality of parameters having different bit-widths; and a controller for assigning an operation for an arbitrary layer of the neural network model to an arbitrary processor among the plurality of heterogeneous processors. An operation for a first portion of the arbitrary layer of the neural network model may be assigned to a first processor among the plurality of heterogeneous processors. An operation for a second portion of the arbitrary layer of the neural network model may be assigned to a second processor among the plurality of heterogeneous processors. A first bit-width of a first parameter for the first portion and a second bit-width of a second parameter for the second portion may be different from each other.

The plurality of parameters may include at least one of a feature map, a weight, a kernel, and an activation map.

The plurality of heterogeneous processors may include one or more of a neural processing unit (NPU), a central processing unit (CPU), a graphic processing unit (GPU), and a Micro Controller Unit (MCU).

The first bit-width may be an integer of 8 bits or an integer of 4 bits, and the second bit-width may be a floating point of 32 bits or a floating point of 16 bits.

The first processor may be an NPU, and the second processor may be one of a CPU, a GPU, and an MCU.

An operation for a first layer of the neural network model may be assigned to the first processor, and an operation for a second layer of the neural network model may be assigned to the second processor.

The bit-width of a parameter for the first layer and the bit-width of a parameter for the second layer may be different from each other.

At least a portion of the plurality of parameters may be quantized.

The quantization may include: 8-bit quantization, 4-bit quantization, and sub-4-bit quantization.

At least a portion of the plurality of parameters may be pruned.

The pruning may include: a method of replacing 80% of weights with 0 (Prune 80%), a method of replacing 70% of weights with 0 (Prune 70%), and a method of replacing 60% of weights with 0 (Prune 60%).

According to another example of the present disclosure, a method is provided. The method may include: a step of assigning an operation for a first portion of an arbitrary layer of a neural network model to a first processor among a plurality of heterogeneous processors; and a step of assigning an operation for a second portion of the arbitrary layer of the neural network model to a second processor among the plurality of heterogeneous processors. Each layer of the neural network model may include a plurality of parameters having different bit-widths. The first bit-width of a first parameter for the first portion and the second bit-width of a second parameter for the second portion may be different from each other.

The method may further include: a step of assigning an operation for a first layer of the neural network model to the first processor; and a step of assigning an operation for a second layer of the neural network model to the second processor.

While the examples of the present disclosure have been described in more detail with reference to the accompanying drawings, the present disclosure is not necessarily limited to these examples, and can be variously modified and implemented within a scope that does not depart from the technical spirit of the present disclosure. Therefore, the examples disclosed in the present disclosure are not for limiting the technical spirit of the present disclosure but for explaining it, and the scope of the technical spirit of the present disclosure is not limited by these examples. Therefore, the examples described above should be understood as being illustrative in all respects and not restrictive. The scope of the present disclosure should be interpreted by the following claims, and all technical spirits within the equivalent scope should be interpreted as being included in the scope of rights of the present invention.

[National R&D Project Supporting This Invention]
[Task Identification Number] 2710007843
[Task Number] 00228938
[Name of Ministry] Ministry of Science and ICT
[Name of Project Management (Specialized) Institution] Institute of Information & communications Technology Planning & Evaluation
[Research Project Title] Artificial Intelligence Semiconductor SW Integrated Platform Technology Development
[Research Task Title] Development of commercial edge AI SoC semiconductor SW development platform technology

27

28

[Contribution Rate] 1/1
[Name of Organization Performing the Task] DEEPX CO., LTD.
[Research period] 2024 Jan. 1~2024 Dec. 31

What is claimed is:

1. A system, comprising:

a plurality of heterogeneous processors configured to perform inference using a neural network model comprising a plurality of layers;

a memory configured to store the neural network model, wherein each layer of the neural network model comprises a plurality of parameters having different bit-widths; and a controller configured to assign an operation for an arbitrary layer of the neural network model to an arbitrary processor among the plurality of heterogeneous processors, wherein an operation for a first portion of the arbitrary layer of the neural network model is assigned to a first processor among the plurality of heterogeneous processors, wherein an operation for a second portion of the arbitrary layer of the neural network model is assigned to a second processor among the plurality of heterogeneous processors, wherein a first bit-width of a first parameter for the first portion and a second bit-width of a second parameter for the second portion are different, wherein at least a portion of the plurality of parameters is pruned according to a pruning ratio, and wherein, when the operation for the arbitrary layer is assigned to the arbitrary processor, the pruning ratio is increased when a computational load of the arbitrary processor is higher than a reference value and is decreased when the computational load is lower than the reference value.

2. The system of claim 1, wherein the plurality of parameters comprises at least one of a feature map, a weight, a kernel, and an activation map.

3. The system of claim 1, wherein the plurality of heterogeneous processors comprises at least one of a neural processing unit (NPU), a central processing unit (CPU), a graphic processing unit (GPU), and a Micro Controller Unit (MCU).

4. The system of claim 1, wherein
the first bit-width is an integer of 4 bits to 8 bits, and
the second bit-width is a floating point of 16 bits to 32 bits.

5. The system of claim 1, wherein
the first processor is an NPU, and
the second processor is one of a CPU, a GPU, and an MCU.

6. The system of claim 1, wherein
an operation for a first layer of the neural network model is assigned to the first processor, and
an operation for a second layer of the neural network model is assigned to the second processor.

7. The system of claim 6, wherein a bit-width of a parameter for the first layer and a bit-width of a parameter for the second layer are different.

8. The system of claim 1, wherein at least a portion of the plurality of parameters is quantized.

9. The system of claim 8, wherein the quantization comprises 8-bit quantization, 4-bit quantization, and sub-4-bit quantization.

10. The system of claim 1, wherein the pruning comprises;

applying a method of replacing 80% of weights with 0 (Prune 80%) to a first subset of the plurality of parameters, applying a method of replacing 70% of weights with 0 (Prune 70%) to a second subset of the plurality of parameters, and applying a method of replacing 60% of weights with 0 (Prune 60%) to a third a subset of the plurality of parameters.

11. The system of claim 1, wherein, for each layer of the neural network model, the controller is further configured to calculate an objective function for each of the plurality of heterogeneous processors, the objective function combining a performance loss of the neural network due to lightening and at least one of processing time, computational load, chip temperature, and power consumption, select, as a main target processor for the arbitrary layer, a processor of the plurality of heterogeneous processors, the selected processor being a processor that minimizes the objective function, and select, as at least one sub target processor for the arbitrary layer, at least one other processor of the plurality of heterogeneous processors, the selected at least one other processor being a processor that has a larger value of the objective function than the main target processor.

12. A System on Chip (SoC), comprising:

a plurality of heterogeneous processors configured to perform inference using a neural network model comprising a plurality of layers;

a memory configured to store the neural network model, wherein each layer of the neural network model comprises a plurality of parameters having different bit-widths; and a controller configured to assign an operation for an arbitrary layer of the neural network model to an arbitrary processor among the plurality of heterogeneous processors, wherein an operation for a first portion of the arbitrary layer of the neural network model is assigned to a first processor among the plurality of heterogeneous processors, wherein an operation for a second portion of the arbitrary layer of the neural network model is assigned to a second processor among the plurality of heterogeneous processors, wherein a first bit-width of a first parameter for the first portion and a second bit-width of a second parameter for the second portion are different, wherein at least a portion of the plurality of parameters is pruned according to a pruning ratio, and wherein, when the operation for the arbitrary layer is assigned to the arbitrary processor, the pruning ratio is increased when a computational load of the arbitrary processor is higher than a reference value and is decreased when the computational load is lower than the reference value.

13. The SoC of claim 12, wherein the plurality of parameters comprises at least one of a feature map, a weight, a kernel, and an activation map.

14. The SoC of claim 12, wherein the plurality of heterogeneous processors comprises at least one of a neural processing unit (NPU), a central processing unit (CPU), a graphic processing unit (GPU), and a Micro Controller Unit (MCU).

15. The SoC of claim 12, wherein the first processor is an NPU, and the second processor is one of a CPU, a GPU, and an MCU.

16. The SoC of claim 12, wherein an operation for a first layer of the neural network model is assigned to the first processor, and an operation for a second layer of the neural network model is assigned to the second processor.

17. An electronic device, comprising:

a plurality of heterogeneous processors for performing inference using a neural network model comprising a plurality of layers;

a controller for assigning an operation for a current layer of the neural network model to one of the plurality of heterogeneous processors, wherein the layers include a first layer comprising parameters having a first bit-width and a second layer comprising parameters having a second bit-width different from the first bit-width, wherein the controller selects at least one first processor from among the plurality of heterogeneous processors to perform an operation for the first layer of the neural network model based on the parameters of the first layer, the selected first processor including a first main target processor and at least one first sub target processor, the operation for the first layer assigned to the at least one first sub target processor if, due to being occupied by another work, the first main target processor cannot perform the operation for the first layer or if an abnormal condition is present in the electronic device, and wherein the controller selects at least one second processor from among the plurality of heterogeneous processors to perform an operation for the second layer of the neural network model based on the parameters of the second layer, the selected second processor including a second main target processor and at least one second sub target processor, the operation for the second layer assigned to the at least one second sub target processor if, due to being occupied by another work, the second main target processor cannot perform the operation for the second layer or if the abnormal condition is present in the electronic device.

18. The electronic device of claim 17, further comprising a memory for storing the neural network model.

19. The electronic device of claim 17, wherein the abnormal condition includes situations where an internal temperature of the electronic device rises above a reference value.

20. The electronic device of claim 17, wherein the abnormal condition includes situations where a remaining battery level of the electronic device falls below a reference value.

* * * * *